United States Patent
Wani et al.

(10) Patent No.: US 10,740,684 B1
(45) Date of Patent: Aug. 11, 2020

(54) METHOD AND SYSTEM TO PREDICT THE EXTENT OF STRUCTURAL DAMAGE

(71) Applicant: One Concern, Inc., Palo Alto, CA (US)

(72) Inventors: Ahmad Wani, Mountain View, CA (US); Nicole Hu, Mountain View, CA (US); Timothy Frank, Stanford, CA (US)

(73) Assignee: ONE CONCERN, INC., Menlo Park, CA (US)

( * ) Notice: Subject to any disclaimer, the term of this patent is extended or adjusted under 35 U.S.C. 154(b) by 587 days.

(21) Appl. No.: 15/246,919

(22) Filed: Aug. 25, 2016

Related U.S. Application Data

(60) Provisional application No. 62/264,989, filed on Dec. 9, 2015, provisional application No. 62/370,964, filed on Aug. 4, 2016.

(51) Int. Cl.
| | |
|---|---|
| *G06F 17/50* | (2006.01) |
| *G01W 1/00* | (2006.01) |
| *G06F 15/00* | (2006.01) |
| *G06Q 50/26* | (2012.01) |
| *G06Q 40/08* | (2012.01) |
| *G06Q 30/02* | (2012.01) |
| *G06N 5/04* | (2006.01) |
| *G06N 20/00* | (2019.01) |

(52) U.S. Cl.
CPC ............... *G06N 5/04* (2013.01); *G06N 20/00* (2019.01)

(58) Field of Classification Search
CPC ........... G06N 5/04; G06N 20/00; G01W 1/00; G06Q 50/06; G06F 17/50; G08B 21/10; G08B 27/00
USPC .......................................................... 706/1–62
See application file for complete search history.

(56) References Cited

U.S. PATENT DOCUMENTS

| | | | | |
|---|---|---|---|---|
| 2004/0236676 | A1* | 11/2004 | Takezawa | G06Q 40/025 705/38 |
| 2009/0061422 | A1* | 3/2009 | Linke | G01N 33/57415 435/6.14 |
| 2009/0204273 | A1* | 8/2009 | Selius | G06Q 40/06 700/302 |
| 2009/0259581 | A1* | 10/2009 | Horowitz | G06Q 40/06 705/35 |

(Continued)

*Primary Examiner* — Brandon S Cole
(74) *Attorney, Agent, or Firm* — Schwegman Lundberg & Woessner, P.A.

(57) ABSTRACT

Methods, systems, and computer programs are presented for predicting the scale and scope of damage after an earthquake. One method includes an operation for identifying a plurality of features, each feature being correlated to an indication of structural damage caused to a structure by an earthquake. The method further includes performing machine learning, using one or more hardware processors, to analyze destruction caused by one or more earthquakes to obtain a damage-estimation algorithm. The machine learning is based on the identified plurality of features. Further, the method includes operations for accessing shaking data for a new earthquake, and for estimating, using the one or more hardware processors, earthquake damage at a block level for a geographical region utilizing the damage-estimation algorithm and the shaking data. Further, the earthquake damage at the block level is presented, on a display screen, in a map of at least part of the geographical region.

20 Claims, 22 Drawing Sheets

(56) References Cited

U.S. PATENT DOCUMENTS

| | | | | |
|---|---|---|---|---|
| 2010/0238027 A1* | 9/2010 | Bastianini | G01D 9/005 | 340/540 |
| 2010/0280755 A1* | 11/2010 | Pillsbury | G06Q 30/02 | 702/2 |
| 2013/0035859 A1* | 2/2013 | Guatteri | G08B 31/00 | 702/3 |
| 2013/0054200 A1* | 2/2013 | Kumarasena | G06F 17/5004 | 703/1 |
| 2013/0216089 A1* | 8/2013 | Chen | G06T 7/0002 | 382/100 |
| 2013/0328688 A1* | 12/2013 | Price | G01V 1/008 | 340/690 |
| 2014/0095425 A1* | 4/2014 | Sipple | G06N 7/005 | 706/52 |
| 2014/0110167 A1* | 4/2014 | Goebel | E21B 44/00 | 175/24 |
| 2014/0188394 A1* | 7/2014 | Febonio | G06F 17/5004 | 702/15 |
| 2014/0249756 A1* | 9/2014 | Hsu | G08B 21/10 | 702/15 |
| 2014/0316614 A1* | 10/2014 | Newman | G06Q 30/0611 | 701/3 |
| 2014/0358592 A1* | 12/2014 | Wedig | G06Q 40/08 | 705/4 |
| 2015/0073834 A1* | 3/2015 | Gurenko | G06Q 40/08 | 705/4 |
| 2016/0048925 A1* | 2/2016 | Emison | G06Q 40/08 | 705/4 |
| 2016/0163186 A1* | 6/2016 | Davidson | G06Q 50/16 | 340/506 |
| 2016/0343093 A1* | 11/2016 | Riland | G06Q 10/04 | |
| 2017/0169534 A1 | 6/2017 | Wani et al. | | |
| 2017/0254910 A1* | 9/2017 | Can | G01V 1/302 | |

\* cited by examiner

Your experience of the earthquake

202

Shaking Strength:
How would you best describe the shaking?

[ Please select ... ▼ ]

Shaking Duration (seconds):
About how many seconds did the shaking last?

[                    ]

How did you react:

[ Please select ... ▼ ]

How did you respond:

[ Please select ... ▼ ]

Stand or Walk:
Was it difficult to stand and/or walk?

[ Please select ... ▼ ]

Fig. 2A

Was there any damage to the building?
Check all that apply.

204

☐ No Damage
☐ Hairline cracks in walls
☐ A few large cracks in walls
☑ Many large cracks in walls
☐ Ceiling tiles or lightning fixtures fell
☐ Cracks in chimney
☑ One or several cracked windows
☐ Many windows cracked or some broken out
☐ Masonry fell from block or brick wall(s)

Fig. 2B

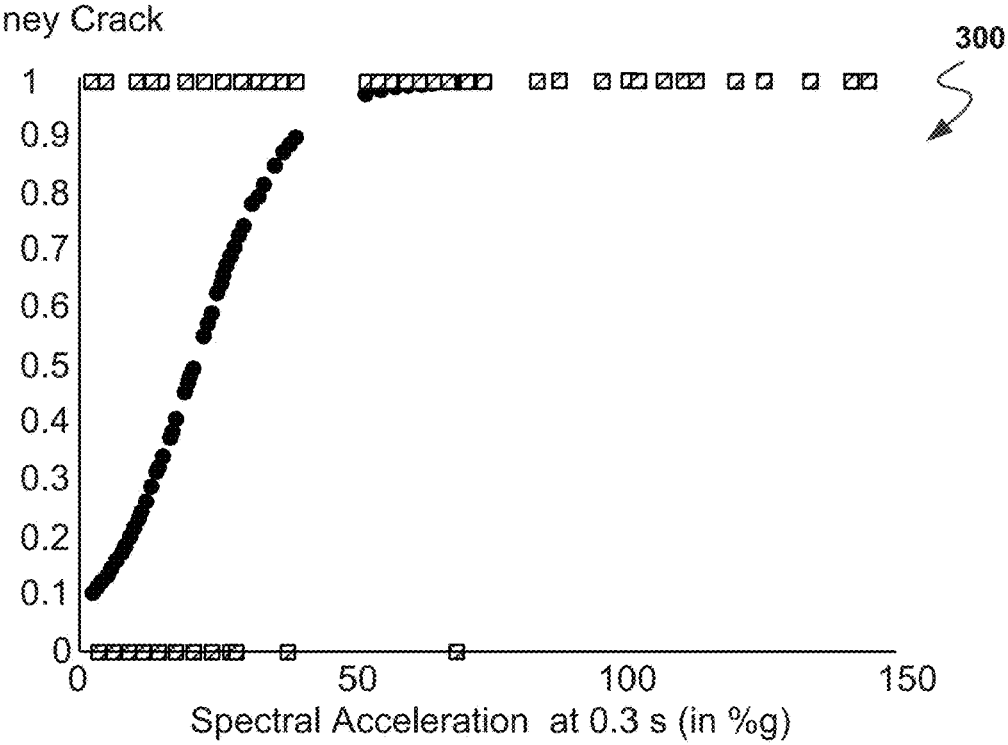
Fig. 3
"Average BDI" represents the most probable damage state of a 'typical' building within that specific census sub-block
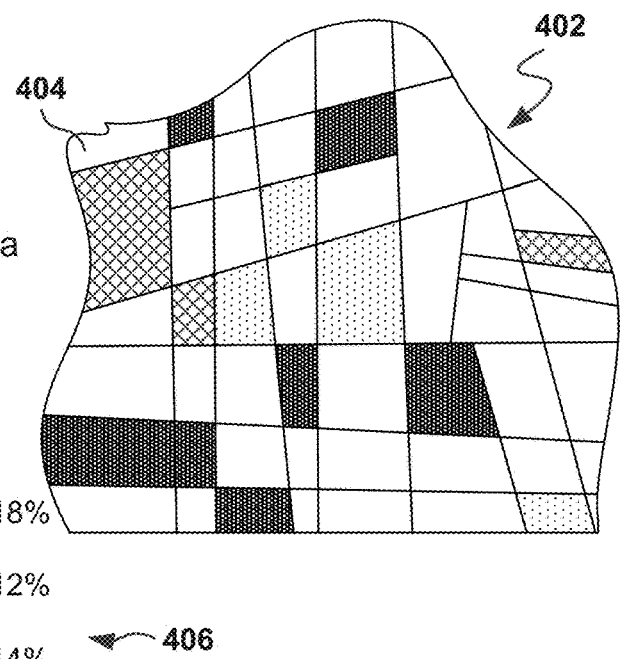
Census Sub-blocks
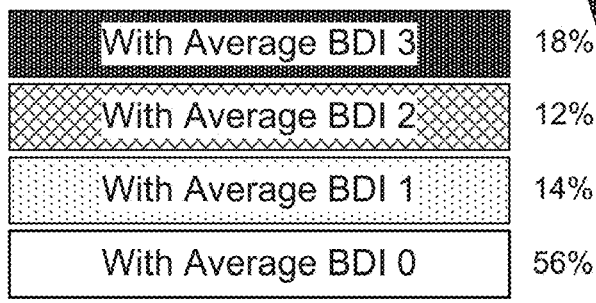
| | |
|---|---|
| With Average BDI 3 | 18% |
| With Average BDI 2 | 12% |
| With Average BDI 1 | 14% |
| With Average BDI 0 | 56% |
Fig. 4

|  Actual BDI | Predicted BDI | | | |
| --- | --- | --- | --- | --- |
|  | 0 | 1 | 2 | 3 |
| 0 | 172 | 23 | 0 | 0 |
| 1 | 64 | 137 | 2 | 0 |
| 2 | 3 | 7 | 97 | 0 |
| 3 | 0 | 0 | 1 | 6 |

Fig. 12

| Algorithm | Training | | Testing | |
| --- | --- | --- | --- | --- |
|  | F-Score | Error | F-Score | Error |
| Random Forest | 0.953 | 1.57% | 0.877 | 17.20% |
| Support Vector Machines | 0.834 | 19.55% | 0.879 | 17.03% |
| Neural Networks | 0.790 | 22.80% | 0.815 | 21.50% |

Fig. 13

2202 — HOUSEHOLD INCOME LEVEL

|  | <=10k | 10k-30k | 30k-50k | 50k-100k | >=100k |
|---|---|---|---|---|---|
| BDI 3 | 31 | 118 | 131 | 141 | 157 |
| BDI 2 | 1456 | 6406 | 6404 | 11986 | 12694 |
| BDI 1 | 283 | 1058 | 1225 | 2583 | 2665 |
| BDI 0 | 37 | 259 | 318 | 460 | 647 |

2208 — AGE GROUP

|  | CHILDREN (<=16) | ADULT (16-65) | SENIOR (>65) |
|---|---|---|---|
| BDI 3 | 268 | 937 | 235 |
| BDI 2 | 26568 | 68364 | 16112 |
| BDI 1 | 3892 | 12448 | 5489 |
| BDI 0 | 152 | 2643 | 258 |

2204 — BUILDING AGE

|  | BEFORE 1940 | 1940-1959 | 1960-1979 | 1980-1999 | AFTER 1999 |
|---|---|---|---|---|---|
| BDI 3 | 96 : 14% | 247 : 36% | 121 : 18% | 141 : 25% | 43 : 6% |
| BDI 2 | 3537 : 8% | 8364 : 20% | 14458 : 34% | 10655 : 25% | 5676 : 13% |
| BDI 1 | 1382 : 15% | 1458 : 16% | 3632 : 40% | 1802 : 20% | 802 : 9% |
| BDI 0 | 319 : 14% | 307 : 13% | 806 : 35% | 662 : 29% | 213 : 9% |

2206 — BUILDING TYPE

|  | BDI 3 | BDI 2 | BDI 1 | BDI 0 |
|---|---|---|---|---|
| RESIDENTIAL | 547 | 35455 | 8037 | 2219 |
| COMMERCIAL | 60 | 1925 | 518 | 115 |
| GOVERNMENT | 24 | 627 | 232 | 55 |

2210 — RESIDENT POPULATION

|  | BDI 3 | BDI 2 | BDI 1 | BDI 0 |
|---|---|---|---|---|
| DAY | 561 | 36441 | 7231 | 1640 |
| NIGHT | 1359 | 106002 | 18981 | 5957 |
| 5PM COMMUTERS | 560 | 45442 | 7132 | 1487 |

Fig. 22

METHOD AND SYSTEM TO PREDICT THE EXTENT OF STRUCTURAL DAMAGE

RELATED APPLICATIONS

This application claims priority from U.S. Provisional Patent Application No. 62/264,989, filed Dec. 9, 2015, entitled "Method and System to Predict the Extent of Structural Damage;" and from U.S. Provisional Patent Application No. 62/370,964, filed Aug. 4, 2016, entitled "Method and System to Predict the Extent of Structural Damage." These provisional applications are herein incorporated by reference in its entirety.

TECHNICAL FIELD

The subject matter disclosed herein generally relates to the processing of data. For example, the present disclosure addresses systems and methods to predict the extent of structural damage caused by natural phenomena (e.g., an earthquake) using performance-based engineering and machine learning.

BACKGROUND

Natural phenomena, such as earthquakes, flooding, and fires, may cause significant damage to life and property. Predicting the extent of such damage may assist in prioritizing emergency services to those most affected by the earthquakes, flooding, and fires.

BRIEF DESCRIPTION OF THE DRAWINGS

Various ones of the appended drawings merely illustrate example embodiments of the present disclosure and cannot be considered as limiting its scope.

FIG. 1 is a network diagram, according to some example embodiments, illustrating a network environment suitable for predicting structural damage caused by phenomena such as fire, earthquake, water, wind or the like.

FIGS. 2A-2B show example embodiments of screenshots of an example graphical user interface (GUI) of selected "Did You Feel It" (DYFI) questions provided by the United States Geological Survey (USGS) web site.

FIG. 3 shows a chimney fragility curve, according to some example embodiments.

FIG. 4 illustrates the Block Damage Index (BDI) by city block, according to some example embodiments.

FIG. 12 shows a confusion matrix, according to an example embodiment, for predictions of damage for 512 testing points.

FIG. 13 shows a performance comparison of algorithms in accordance with some example embodiments.

FIG. 22 illustrates several damage tables by demographic, according to some example embodiments.

DETAILED DESCRIPTION

Figure 1:
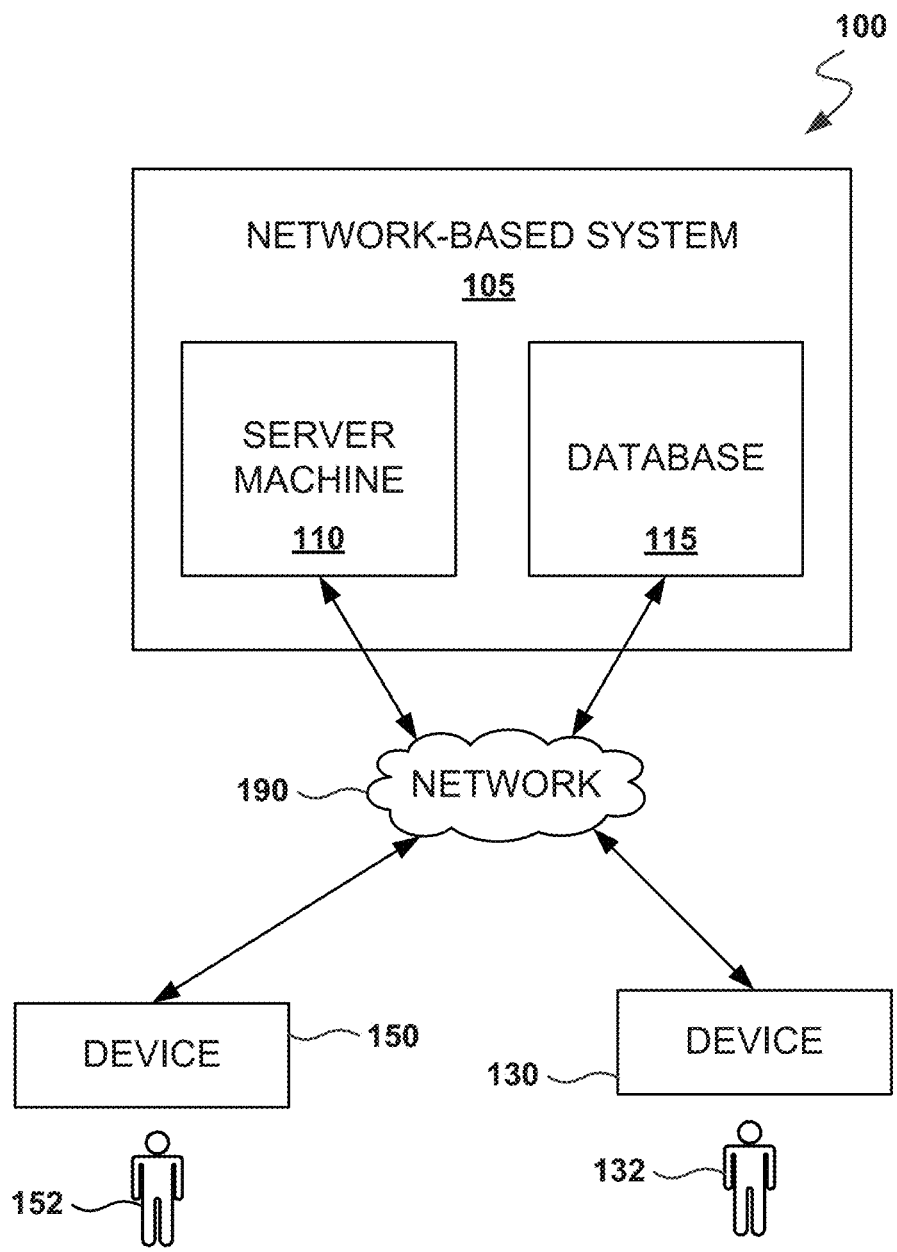

Example methods, systems, and computer programs are directed to predicting the scale and scope of damage after an earthquake. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Predicting the scale and scope of damage as quickly as possible following an earthquake is beneficial in coordinating local emergency response efforts; implementing shelter, food, and medical plans; and requesting assistance from the state and federal levels. Additionally, estimating the damage and economic losses of individual homes is beneficial in assessing household risk and establishing insurance rates. Example embodiments described herein apply machine learning to predict damage after a disaster and estimate losses. The machine learning techniques may be allied with Performance Based Earthquake Engineering to predict damage. Using features known to influence how earthquakes affect structures (e.g., type of structure, amount of shaking, soil characteristics, structural parameters, etc.), extensive data can be collected from multiple sources, and substantial preprocessing techniques are implemented in example embodiments.

Pre-calculated damage states from thousands of homes from past earthquakes (e.g., stored in one or more databases) may serve as a training set, and machine learning techniques (e.g., Support Vector Machines (SVM), random forest, neural networks, or the like) are used to develop an application that can estimate damage to building structures (e.g., single family homes) in a geographical area (e.g., the state of California). In some example embodiments, damage assessment may be estimated quickly after an earthquake, including damage summary at the city-block level.

One general aspect includes a method including an operation for identifying a plurality of features, each feature being correlated to an indication of structural damage caused to a structure by an earthquake. The method further includes an operation for performing machine learning, using one or more hardware processors, to analyze destruction caused by one or more earthquakes to obtain a damage-estimation algorithm, the machine learning being based on the identified plurality of features. The method also includes operations for accessing shaking data for a new earthquake, and for estimating, using the one or more hardware processors, earthquake damage at a block level for a geographical region utilizing the damage-estimation algorithm and the shaking data. The method also includes an operation for causing presentation, on a display screen, of the earthquake damage at the block level in a map of at least part of the geographical region One general aspect includes a non-transitory machine-readable storage medium including instructions that, when executed by a machine, causes the machine to perform operations including: identifying a plurality of features, each feature being correlated to an indication of structural damage caused to a structure by an earthquake; performing machine learning, using one or more hardware processors, to analyze destruction caused by one or more earthquakes to obtain a damage-estimation algorithm, the machine learning being based on the identified plurality of features; accessing shaking data for a new earthquake; estimating, using the one or more hardware processors, earthquake damage at a block level for a geographical region utilizing the damage-estimation algorithm and the shaking data; and causing presentation, on a display screen, of the earthquake damage at the block level in a map of at least part of the geographical region.

One general aspect includes a system, including: a memory including instructions, and one or more computer processors. The instructions, when executed by the one or more computer processors, cause the one or more computer processors to perform operations including: identifying a plurality of features, each feature being correlated to an indication of structural damage caused to a structure by an earthquake; performing machine learning, using one or more hardware processors, to analyze destruction caused by one or more earthquakes to obtain a damage-estimation algorithm, the machine learning being based on the identified plurality of features; accessing shaking data for a new earthquake; estimating, using the one or more hardware processors, earthquake damage at a block level for a geographical region utilizing the damage-estimation algorithm and the shaking data; and causing presentation, on a display screen, of the earthquake damage at the block level in a map of at least part of all or part of the geographical region.

It is noted that the embodiments illustrated herein are described with reference to estimating earthquake damage, but the same principles may be applied to other disasters, such as floods, terrorism, fires, tornados, high winds, hurricanes, storms, tsunamis, heat waves, riots, war, etc.

FIG. 1 is a network diagram, according to some example embodiments, illustrating a network environment suitable for predicting structural damage caused by phenomena such as fire, earthquake, water, wind or the like. The network environment 100 includes a server machine 110, a database 115, and devices 130 and 150, all communicatively coupled to each other via a network 190. The server machine 110 may form all or part of a network-based system 105 (e.g., a cloud-based server system configured to provide one or more services to the devices 130 and 150). The server machine 110 and the devices 130 and 150 may each be implemented in a computer system, in whole or in part, as described below with respect to FIG. 26. The server machine 110 may contain algorithms that manipulate the data received from the user devices 150 to make the data usable, or to format the data, for use by the database 115.

Also shown in FIG. 1 are two example users 132 and 152 that may enter, for example, earthquake damage data into associated user devices 130, 150. For example, the device 130 may be a desktop computer, a vehicle computer, a tablet computer, a navigational device, a portable media device, a smartphone, or a wearable device (e.g., a smart watch or smart glasses) belonging to the user 132. The user devices 130, 150 may generate one or more of the GUIs shown herein. The database 115 may include historic data on phenomena such as earthquakes, floods, fire damage, wind, etc., and includes built-environment data and natural-environment data.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 26. As used herein, a "database" is a data storage resource and may store data structured as a text file, a table, a spreadsheet, a relational database (e.g., an object-relational database), a non-relational database, a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

FIGS. 2A-2B show example embodiments of screenshots 202 and 204 of an example graphical user interface (GUI) of selected "Did You Feel It" (DYFI) questions provided in the website of the United States Geological Survey (USGS), a scientific agency of the United States government.

After a natural disaster, such as an earthquake, emergency response centers receive a large number of 911 calls. For example, in the magnitude 6.0 Napa earthquake, thousands of 911 calls were received, and it took several days for the response teams to address all those calls. These calls are prioritized on a first-come first-served basis. However, some of the calls were not for help, but were placed just to notify the authorities about the earthquake. Further, about the majority of the calls did not come from Napa itself, but from neighboring areas, because the most-damaged areas did not have working telephone networks. Part of the job for an emergency manager is figuring out whether a jurisdiction is proclaiming or not, e.g., if the corresponding agency qualifies for a FEMA aid or presidential declaration. Some emergency managers use a technique called windshield tours, where the emergency managers go around their jurisdiction, typically in a slow-moving car, and use a paper-map and a binder to manually note down the damage. It may take them several weeks to figure out whether a particular jurisdiction is proclaiming. Moreover, the accuracies of the windshield tours are pretty low, e.g. in the Napa 2014 earthquake, it took emergency managers 90 days to decide which areas were proclaiming, and several areas were missed.

Emergency-response teams aim to help those in need quickly, but it is difficult to prioritize responses after a natural disaster. Embodiments presented herein provide valuable tools to emergency operation centers (EOCs), response teams (e.g., fire stations), disaster planning organizations, community leaders, other government institutions, corporations site managers, etc., by estimating where the damage has been greatest and providing easy-to-use interface tools to indicate where rescue should be prioritized.

There are many types of data that may be used for estimating earthquake damage. One type of data is people impressions after an earthquake. The website of the United States Geological Survey (USGS) has an online post-earthquake survey form called "Did You Feel It?" (DYFI) where respondents report what they felt and saw during an earthquake.

For example, screenshot 202 in FIG. 2A is a user interface that asks the respondent several simple questions regarding the earthquake, such as how strongly was the earthquake felt, how long did the earthquake last, how did the respondent react, etc. Screenshot 204 of FIG. 2B presents the respondent a list of possible damage events, with a checkbox next to each event. The respondent may then select the events associated with the earthquake, such as no damage was inflicted, there are hairline cracks in the walls, ceiling tiles or lighting fixtures fell, there are cracks in the chimney, etc.

The USGS computes a Community Decimal Intensities (CDI) value for each survey response using Dewey and Dengler procedures, aggregates the data, and ultimately reports the aggregate CDI value for each zip code or other geographic region of interest. Community Decimal Intensities (CDI) are not individual observations, but rather a measure of earthquake effects over an area.

In example embodiments, the CDI values computed for each response are considered to be a classification for machine learning. CDI values can be augmented by other damage indicators including post-disaster inspection reports, aerial, or satellite imagery, etc. In example embodiments, the scope of analysis may be restricted to estimating damage to city blocks, or to single-family homes, or to commercial buildings, or to special buildings (e.g., hospitals, firehouses). Example embodiments may allow an individual homeowner, with limited knowledge of earthquake engineering, to determine a damage state across a range of seismic hazard levels as well as calculate expected losses from each hazard level. Further, an expected annual loss may be determined that may be useful for making informed decisions regarding household financial planning. The damage estimates for single homes can be aggregated at the community or block level in order to use as a planning tool for emergency responders and city planners, for example. Decision makers can be better informed to make planning and policy decisions based on the probabilistic-based risk methods used to estimate structural damage presented herein.

A census block is the smallest geographic unit used by the United States Census Bureau for tabulation of 100-percent data (data collected from all houses, rather than a sample of houses). Census blocks are typically bounded by streets, roads, or creeks. In cities, a census block may correspond to a city block, but in rural areas where there are fewer roads, blocks may be limited by other features. The population of a census block varies greatly. As of the 2010 census, there were 4,871,270 blocks with a reported population of zero, while a block that is entirely occupied by an apartment complex might have several hundred inhabitants. Census blocks are grouped into block groups, which are grouped into census tracts.

In one example embodiment, a city block, also referred to herein as a block, is defined by the census block, but other example embodiments may define a city block as a different area, such as a census block group or a census tract.

In general, a block is a continuous region delimited by a geographic area, and each block may have the same size or a different size. For example, the block may range in size from one acre to ten acres, but other acreage may be used. In high-density population areas, the block may be as small as half an acre, but in less populated areas, the block may include 100 acres or more. A block may include zero or more structures.

In some example embodiments, to simplify definition, the blocks may be defined by a grid on a map, where each square or rectangle of the grid is a block. If a building were situated in more than one block, then the building would be considered to be in the block with the largest section of the building. In other example embodiments, the block is defined by the application developer by dividing a geographic area into a plurality of blocks.

Further, for example, immediately following an earthquake, a disaster response center within a community may be able to examine the estimate for the extent and severity of the damage to determine how homes (or any other physical structure) in their community are affected, and subsequently tailor response and recovery efforts based on the estimates.

The performance-based earthquake engineering (PBEE) methodology developed by the Pacific Earthquake Engineering Research (PEER) Center follows a logical, stepwise approach to performance assessment and subsequent damage and loss estimates of a structure due to an earthquake. The framework is rigorous, probabilistic, and utilizes inputs from disciplines such as seismology, structural engineering, loss modeling, and risk management to ultimately generate data of seismic consequences.

In an example embodiment, DYFI data for past California earthquakes is accessed to train the damage-estimation algorithm. The DYFI data includes information from events with at least 1,000 responses from 50 seismic events, with a bias towards more recent events, events centered near high-density populated areas, and events of larger magnitudes. The supplied data spans from magnitudes 3.4 (San Francisco Bay area, April 2011) to 7.2 (Baja, April 2010). It is however to be appreciated that DYFI data is merely an example of data that could be used, and that data from any other geographical areas or sources may also be used and analyzed. Another source data may be the Earthquake Clearinghouse maintained by the Earthquake Engineering Research Institute.

Features collected from the DYFI dataset include house location, damage state (CDI), and description of home damage. Another source of data is the USGS, which provides data including earthquake magnitude, duration of shaking, epicenter location, spectral acceleration (e.g., shakemap), soil type, elevation, and spectral acceleration at various return periods. Another source of data is the U.S. Census, which provides data for features such as house size, house age, and house price.

Further, features may be derived from other types of data by combining or calculating two or more pieces of information. For example, derived features include the probability of entering five different damage states (Hazus from the Federal Emergency Management Agency (FEMA) technical manual), spectral displacement, and probability of chimney cracking.

It is noted that Vs30 is a parameter that describes soil conditions. A ground motion parameter Sd may be calculated using a computing device as follows:

$$Sd = Sa\left(\frac{T}{\pi}\right)^2$$

Where Sa is spectral acceleration, a ground motion intensity parameter of an earthquake, and T is an assumed structural period (e.g., 0.35 s or 0.4 s, but other values are also possible). The assumed structural period may be determined from Hazus guidelines depending on the size of the building structure (e.g., home).

FIG. 3 shows a chimney fragility function 300, according to some example embodiments. A fragility function is a mathematical function that expresses the probability that some undesirable event occurs (e.g., that an asset—a facility or a component—reaches or exceeds some clearly defined limit state) as a function of some measure of environmental excitation (typically a measure of acceleration, deformation, or force in an earthquake, hurricane, or other extreme loading condition). The fragility function represents the cumulative distribution function of the capacity of an asset to resist an undesirable limit state.

A fragility curve depends on many parameters, such as structural type (construction material), size, seismic zone, and seismic design code used (which is a function of location and age of the structure). In some example embodiments, the damage may be labeled as N (none), S (slight), M (moderate), E (extensive), and C (complete). In an example embodiment, P (no damage) and P (slight damage) may use Sd as an input along with stored fragility parameters. The probability of no damage for each of five damage states can be computed using the Hazus fragility curve parameters (e.g., using Hazus Technical Manual). The probable damage states for structural, non-structural drift-sensitive, and non-structural acceleration-sensitive components may be computed separately using one or more computing devices.

It is noted that fragility functions are often represented as two-dimensional plots, but the fragility functions can also be created using 3 or more dimensions, in which case, the effect of two or more features are combined to assess the damage state. Further, fragility functions are not static, and can change over time. Natural environmental conditions changes (e.g., water table and climate), and man-made conditions changes (e.g., structural retrofits and new construction) may require fragility functions to be modified over time to facilitate more accurate damage predictions. Fragility functions for a given structure may also be changed based on damage that the given structure may have sustained due to a previous earthquake. Modified fragility functions may then be used to estimate structural damage during an aftershock, resulting in more accurate damage predictions than predictions from unmodified fragility functions.

As discussed above, DYFI data may include information about observed damage to walls, chimneys, etc. The probability of a chimney cracking may be computed by sorting DYFI responses into two categories: whether any type of chimney damage was reported or not. A sigmoid fragility function may then be fit through logistic regression such that the independent variable is spectral acceleration Sa at a structural period of, for example, 0.3 seconds, and the dependent variable is the probability of chimney cracking Pcc. In some example implementations, the sigmoid function is approximated by a cumulative lognormal function.

Fragility function 300 is an example chimney fragility curve. In an example embodiment, a probability of 1 corresponds to Sa values that may have driven chimney damage. The example chimney fragility curve, a sigmoid curve, is fairly steep, indicating there is a fairly abrupt transition from no damage to some damage for increasing values of spectral acceleration.

An example empirical fragility curve may be derived using the following equation:

$$Pcc = 0.5 + 0.5 * \text{Erf}\left(\frac{\ln Sa - \mu}{(2\sigma)^2}\right)$$

Where P cc is the fragility estimation of the probability that the structure's chimney is cracked given a spectral acceleration, Sa is the ground-motion intensity parameter, Erf is the complementary error function of the lognormal distribution, μ is the mean, and a is the standard deviation of the variable's natural logarithm. In this example, μ is 3.07 and σ is 0.5.

FIG. 4 illustrates the block damage index (BDI) by city block 404, according to some example embodiments. After entering basic earthquake information, which may be an automated step, like epicenter latitude, longitude, and magnitude, the web application may generate maps, each of which may provide a predicted damage state distribution of neighboring areas (e.g., 100 km from the epicenter) in one example.

Despite the highly uncertain nature of earthquake engineering problems, augmenting the PBEE framework with machine learning results in acceptable accuracy in damage prediction. In an example embodiment, the SVM provides at least a plausible representation of damage. In fact, this means that machine learning may replace waiting for DYFI data when estimating community-wide damage. Further, this approach can, in certain embodiments, fill in geographic gaps in community-wide damage assessment, giving near-immediate and fairly accurate results. Situational awareness immediately after any type of natural disaster can be enhanced, and resource allocation of response equipment and personnel can be more efficient at a community-level following this approach. Although some example embodiments described herein are with reference to California, it should be noted that the methods and systems described herein may be applied to any geographical area.

In an example embodiment, comprehensive housing data can improve damage-state estimates. Additionally, the methodology described herein may apply to the analysis of any type of structure (or structures), taking into account their current seismic health, type of construction material, and lateral resisting system. Example embodiments may allow for better damage analysis for the community, including businesses, mid-rises, etc., and thereby provide a more accurate estimate of loss. It is however to be appreciated that the methods and systems described herein may also be applied to predicting fire damage, flood damage, wind damage, or the like.

Empirical equations (extracted from parametric learning techniques) relating damage state to the input features are used in some example embodiments. In an example embodiment, a Monte Carlo method is used to obtain data for higher CDI values since there are few training data available. In certain circumstances, shaking intensity values of large events at other parts of the world (e.g., Tohoku, Japan, 2010), which are not necessarily in a similar scenario, are applied using transfer-learning techniques to extrapolate to other regions. Using transfer-learning techniques, the prediction of damage states for severe catastrophes is enhanced.

As the algorithms estimate damage after an earthquake, as discussed in more detail below, in some example implementations, an estimate of damage is provided by city block 404 in a map. In the example embodiment of FIG. 4, the map shows the damage estimate 402 by city block 404, and the damage is represented by the shading (or color) of the city block 404. It is noted that the terms "damage estimate" and "damage prediction" are used herein to denote the output of the machine-learning algorithm, the difference being that "damage estimate" refers to an event that has already taken place (e.g., a new earthquake) while "damage prediction" refers to an event that has not taken place yet (e.g., effects of a machine-simulated earthquake), although the term "prediction" may sometimes be used to estimate the damage after an earthquake since damage data is not yet available.

In general, a large variation can be expected in observed damage states from earthquakes. In an example embodiment, and illustrated in FIG. 4, damage is classified into four damage states, and each damage state is given a Block Damage Index (BDI) label 406 in lieu of a CDI label. Depending on the level of precision desired, the number of classifications and the scaling system may change, but in general, this is a reasonable approach based on the exclusivity and differentiability of each of the four damage states. In one example implementation, BDI labels 406 are defined as follows:

BDI=0 for CDI≤4;
BDI=1 for CDI≤7;
BDI=2 for 7<CDI≤9; and
BDI=3 for CDI>9.

In one example implementation, each BDI is assigned a color for the user interface: 0 is green, 1 is yellow, 2 is orange, and 3 is red, but other color mappings are also possible. For each city block 404, the average BDI represents the most probable damage state of a typical building within that specific city block 404. In one example embodiment, the typical building is calculated by averaging the data for the buildings in the city block 404.

In some example embodiments, in a short amount of time after an earthquake (e.g., 15 minutes), a damage estimate 402 is provided by city block 404. These estimates 402 may be used by the EOC to prioritize rescue operations. In other solutions, EOCs utilize a heat map of 911 calls, but this may be misleading because the worst-damaged areas will not have phone service.

In some example embodiments, a BDI of 3 for a city block 404 does not mean that all the buildings in the block have a BDI of 3. Different builders may have different structures, ages, etc., so having a total city collapse may be infrequent. A city block is said to have a BDI of 3 when at least a predetermined percentage of buildings in the block have a BDI of 3, such as, for example, when at least 10% of the buildings in the block have BDI of 3. The percentage threshold may be adjusted and vary between 1 and fifty percent or some other greater value.

In one view, the operator may change the percentage threshold. For example, if the operator wants to see all the city blocks 404 with at least one building with a BDI of 3, the threshold may be lowered to a very small number, such as 0.01%.

Figure 5:
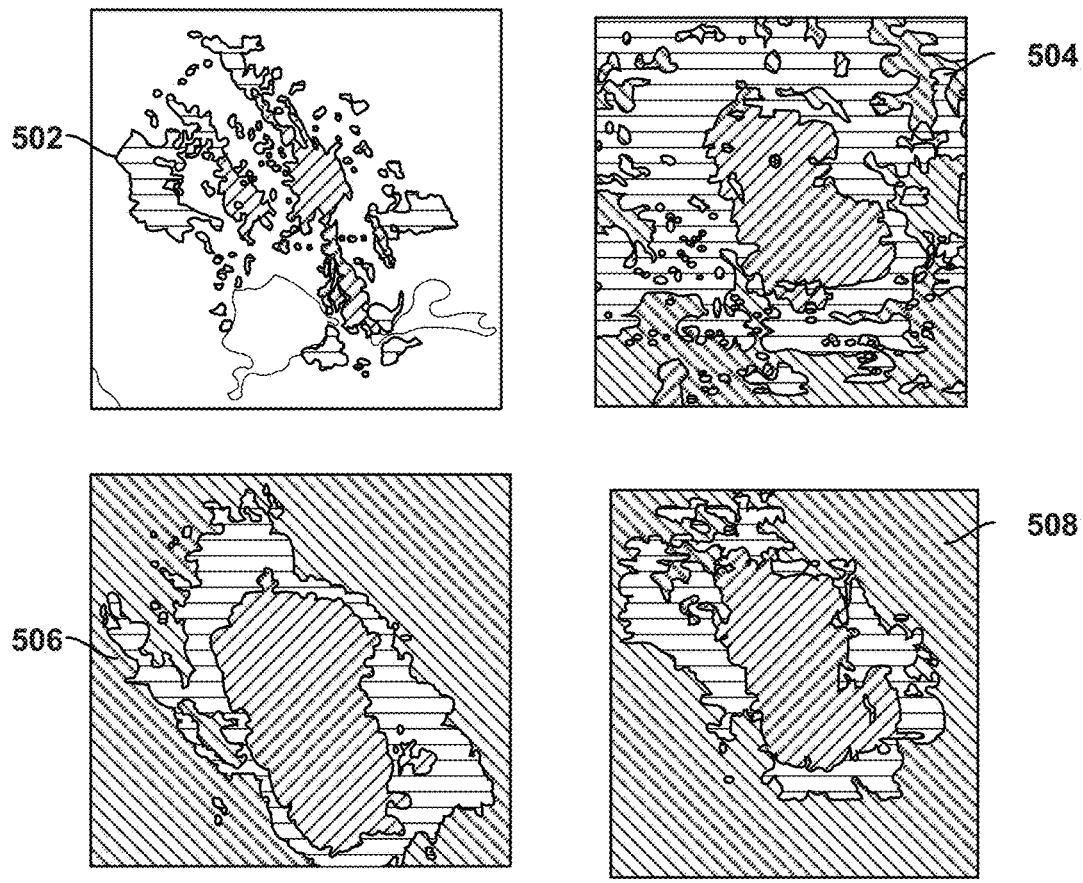
FIG. 5 shows an example graphical representation comparing DYFI data to Random Forest (RF), neural networks (NN) BDI, and Support Vector Machines (SVM) BDI damage-prediction results of the August 2014 (Napa) earthquake, according to one example embodiment.

FIG. 5 shows an example graphical representation comparing actual DYFI data 502 to RF 504, NN 506, and SVM 508 BDI damage-prediction results of the August 2014 (Napa) earthquake, according to one example embodiment. Machine learning is a field of study that gives computers the ability to learn without being explicitly programmed. Machine learning explores the study and construction of algorithms that can learn from and make predictions on data. Such machine-learning algorithms operate by building a model from example inputs in order to make data-driven predictions or decisions expressed as outputs. Although example embodiments are presented with respect to a few machine-learning algorithms, the principles presented herein may be applied to other machine-learning algorithms.

In some example embodiments, different machine-learning algorithms may be used. For example, Random Forest (RF), neural networks (NN), and Support Vector Machines (SVM) algorithms may be used for estimating damage. More details are provided below regarding the use of machine-learning algorithms with reference to FIGS. 9 to 15. In some example embodiments, ensemble methods may be utilized, which are methods that utilize multiple machine-learning algorithms in parallel or sequentially in order to better utilize the features to predict damage.

RF is robust in dealing with outliers, such as variation in damage states of nearby points, at the expense of relatively less predictive power. Moreover, RF may be good at ignoring irrelevant data. SVM may be considered because of its higher accuracy potential and theoretical guarantee against overwriting. NN may be considered because NN produces an equation relating damage with the algorithm features. This equation could then be used to get empirical relationships between damage and features.

After implementing RF, SVM, and NN algorithms, damage predictions for one example earthquake were compared to the actual DYFI data. FIG. 5 shows a graphical comparison of the actual DYFI data 502 to estimates given by RF 504, NN 506, and SVM 508, for the August 2014 (Napa) earthquake. It can be observed that the distribution of the damage states compares well with the actual DYFI data 502 distribution. Also, the algorithms appear to be robust; the algorithms calculated damage states for regions where no DYFI response was recorded. This can be helpful in areas where the community is not able to access DYFI quickly after an earthquake due to lack of connectivity or where significant damage is caused by the earthquake. It is noted that a boundary between the lower two damage states is much more refined in SVM 508 than RF 504 due to SVM's resistance to over-fitting. Hence, SVM was considered to be a good machine learning model for this example earthquake.

It may be reasonable to assume that the general scope of damage and loss is fairly similar within the same damage state. A similar assumption may be made in the PBEE approach, and structures are said to be in the same damage state if they would undergo the same degree of retrofit measures. Example tuning parameters for SVM, C (penalty) and g (margin) may also be determined.

Figure 6:
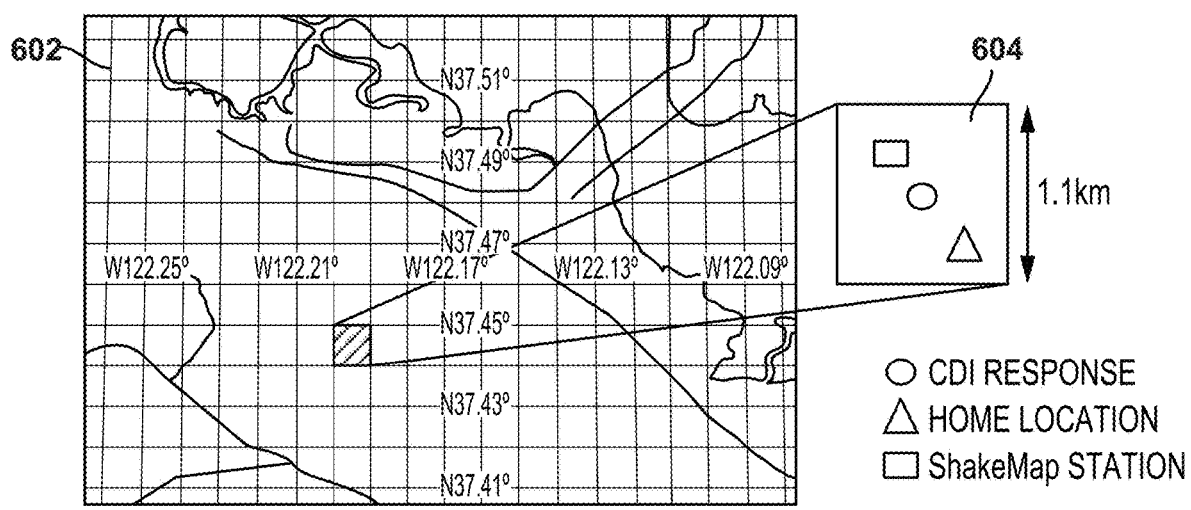
FIG. 6 shows an example embodiment for aggregating data from multiple sources to the same locations using a nearest neighbor function.

FIG. 6 shows an example embodiment for aggregating data from multiple sources to the same locations using a nearest neighbor function. In an example embodiment, a final stage of data pre-processing is performed to eliminate any skewness/bias of the data towards lower to mid-level CDIs (e.g., below 8). Approximately equal numbers of data points pertaining to each damage state may make learning more productive and effective in future predictions. Monte Carlo simulation may be used in order to increase the amount of data points for higher CDIs (e.g., above 8). The data may then be randomized and features may be scaled, for example, between 0 and 1. This scaling may allow the algorithm to treat each feature equally and avoid the possibility of a skewed dataset. In some example embodiments, an "in-poly" function is used to geographically associate features within boundaries, e.g., a seismic zone or a city block, particularly when the block has an irregular shape.

In an example embodiment, at a conclusion of a pre-processing phase, only the most accurate data spanning the entire range of CDIs may remain. In an example embodiment, this remaining data may define or form the training dataset. Map 602 in FIG. 6 is a satellite map of an area, which is subdivided into square areas. If the operator zooms in on the map 604, additional points of interests are identified, such as the location of the CDI response center, the location of a particular home, or a ShakeMap station.

Figure 7:
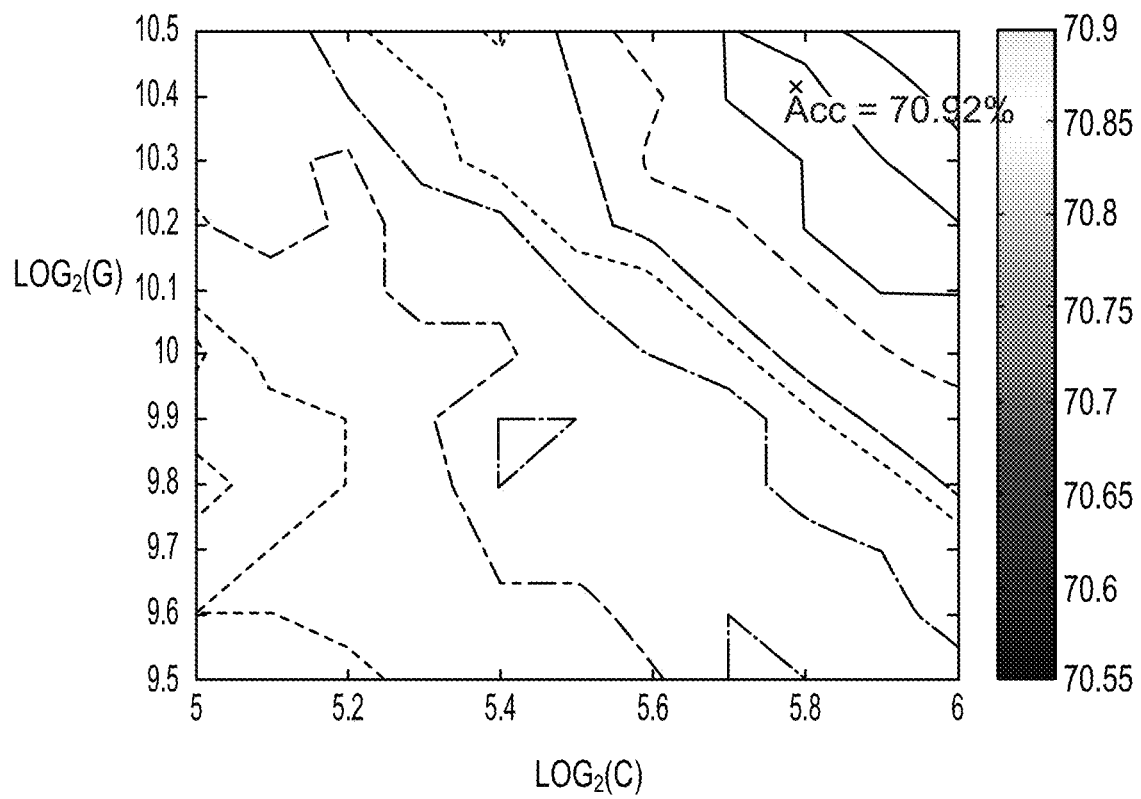
FIG. 7 shows an example cross-validation contour plot for a preliminary dataset, according to some example embodiments.

FIG. 7 shows an example cross-validation contour plot for a preliminary dataset, according to some example embodiments. Several cross-validation contour plots were created as an example of tuning the model. Once the training set was solidified and the sequence of algorithms were chosen, tuning was done in order to prevent over-fitting or under-fitting data when the model is used to predict damage following the next earthquake. In the example plot, the best accuracy is about 70.92%, occurring when C=5.8 and g=10.4. A Gaussian kernel is chosen by way of example as the best fit after experimenting with linear, polynomial and other RBF kernel options.

In an example embodiment, forward and backward search methods are used to determine which features contribute more than others to accurate damage estimation. In an example embodiment, the parameters Vs30, Sa, Sd, P (no damage), P (slight damage), and P (chimney damage) were used.

Figure 8:
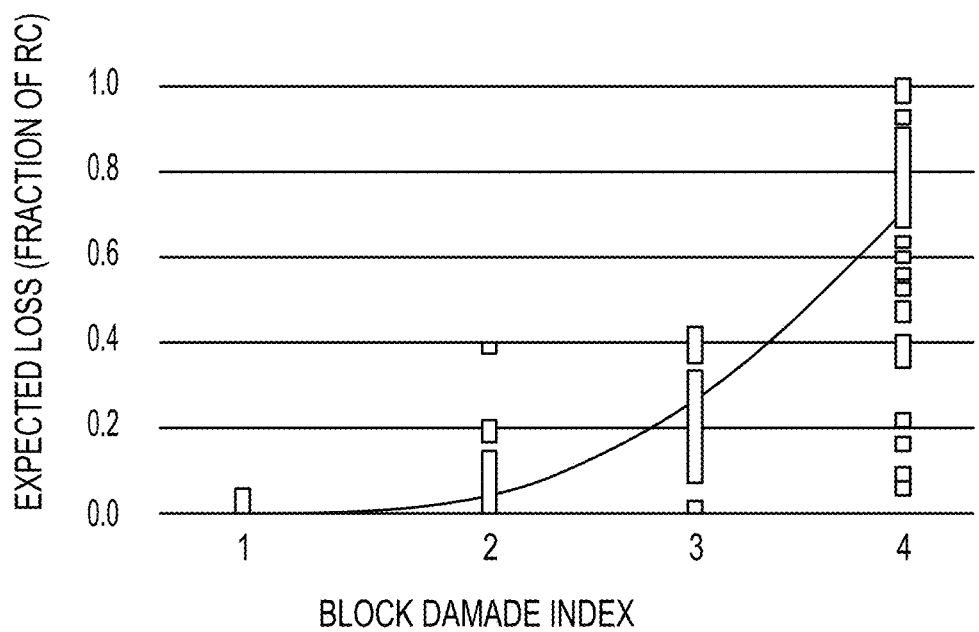
FIG. 8 shows an expected loss of an example home curve, according to some example embodiments.

FIG. 8 shows an expected loss of an example home curve, according to some example embodiments. In some example embodiments, the performance-based earthquake engineering approach is used to calculate financial loss from structural damage using a damage ratio and the structure's replacement value. In an example embodiment, expected values of economic loss and recovery time are calculated. For example, using the entire training set, repair cost ratios from Hazus are used for the calculations.

To calculate the expected loss, a weighted sum of the loss, given the damage state and the probability of being in each Hazus damage state, may be determined through a weighted sum technique. In an example embodiment, structural, non-structural drift-sensitive, non-structural acceleration-sensitive, and contents are considered separately. The conditional loss parameters may be adopted from the Hazus technical manual.

The expected loss of the home may be defined as the sum of expected losses for structural and non-structural elements, not including contents. A similar plot may be developed for expected loss of contents. Expected annual loss (EAL) for both home and contents may be calculated by numerical integration across the hazard curve from, for example, 0.01 g to 5.0 g using a step size of 0.01 g. Recovery time may be computed in a similar fashion as expected losses. Recovery parameters can be obtained from the Hazus technical manual, and include not only construction time, but also time to procure financing, design, decision making, or the like. A mean and standard deviation of loss and recovery time at each BDI may be determined and applied to each respective BDI prediction. Additionally, loss estimates can be aggregated at the block level and displayed on a map or in a report.

Figure 9:
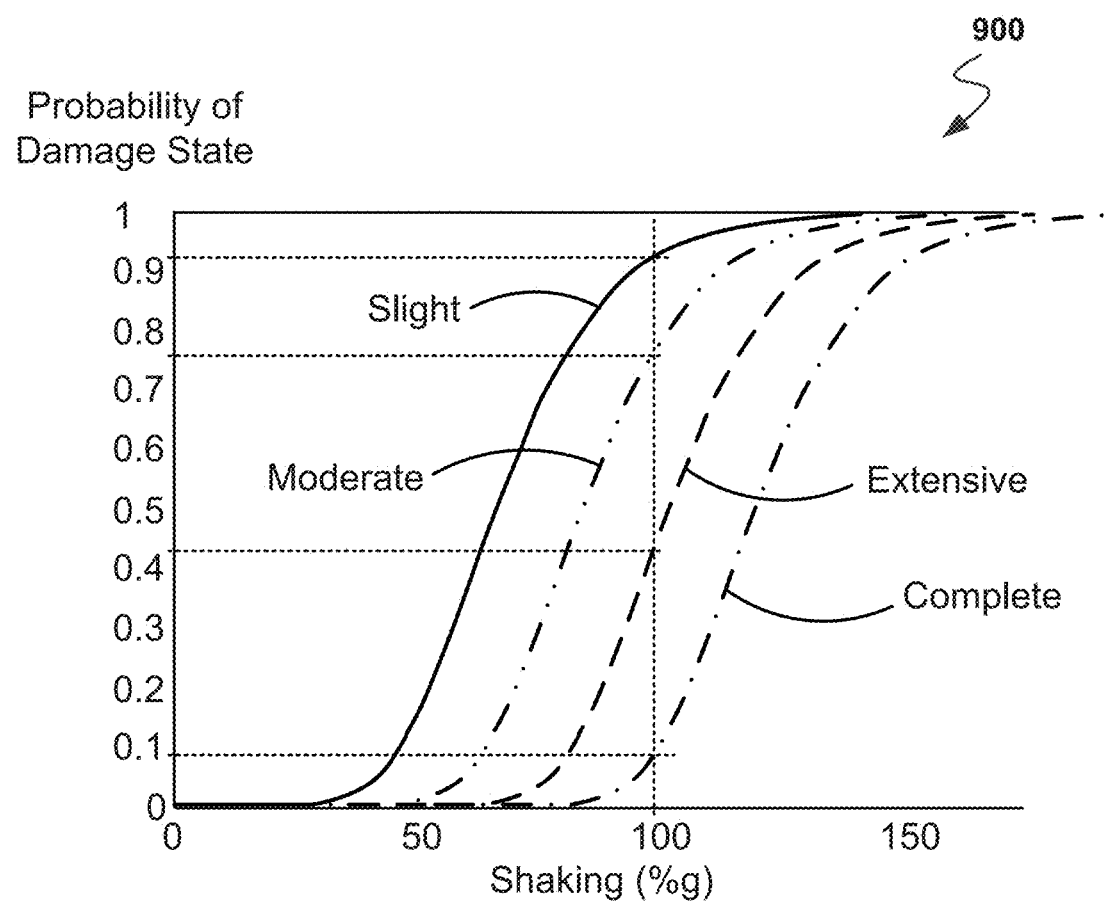
FIG. 9 shows fragility functions for different BDI levels, according to some example embodiments.

FIG. 9 shows fragility functions 900 for different BDI levels, according to some example embodiments. As discussed above, the fragility functions provide the probability of damage state as a function of the shaking. FEMA defines a building type framework with up to 252 types of buildings, and each building within the region is assigned to one of these 252 types. For example, the types may be based on construction material, number of stories, etc., and one type is defined for two-story wooden structures. Further, buildings within one or more blocks may be assigned to additional building types above and beyond the FEMA framework, as applicable, if needed in order to better represent the response of that building to the effects of earthquakes or other disasters.

Each structure may respond differently to an earthquake; therefore, a fragility function is calculated for each type. In the example embodiment of FIG. 9, fragility functions 900 are defined for one building type for the four different types of damage. Based on that, the probability of being in one of the five damages states (none, slight, moderate, extensive, or complete) or a state of higher damage may be determined. For example, for a shaking of 1 g, the probability of no damage is 8%, the probability of slight damage or worse is 25%, the probability of moderate damage or worse is 58%, the probability of extensive damage or worse is 91%, and the probability of complete damage is 9%. This means that for the same shaking, the probability of higher damage is lower, in general.

In one example embodiment, these fragility curves are used to estimate the damage for each building type once the shaking of the building is determined according to its location. However, there are more factors that affect damage besides building type, such as the soil type, year built, building price, etc. For example, not all the two-story wooden buildings have the same price and are built with the same quality. Therefore, the damage resulting to these buildings may vary significantly. Thus other example embodiments utilize more features, besides building type, to estimate damage.

Machine-learning algorithms work well for predicting damage because these algorithms analyze a plurality of features and how the features correlate to the damage inflicted. For example, machine-learning algorithms can take into account hundreds of features to estimate damage.

Figure 10:
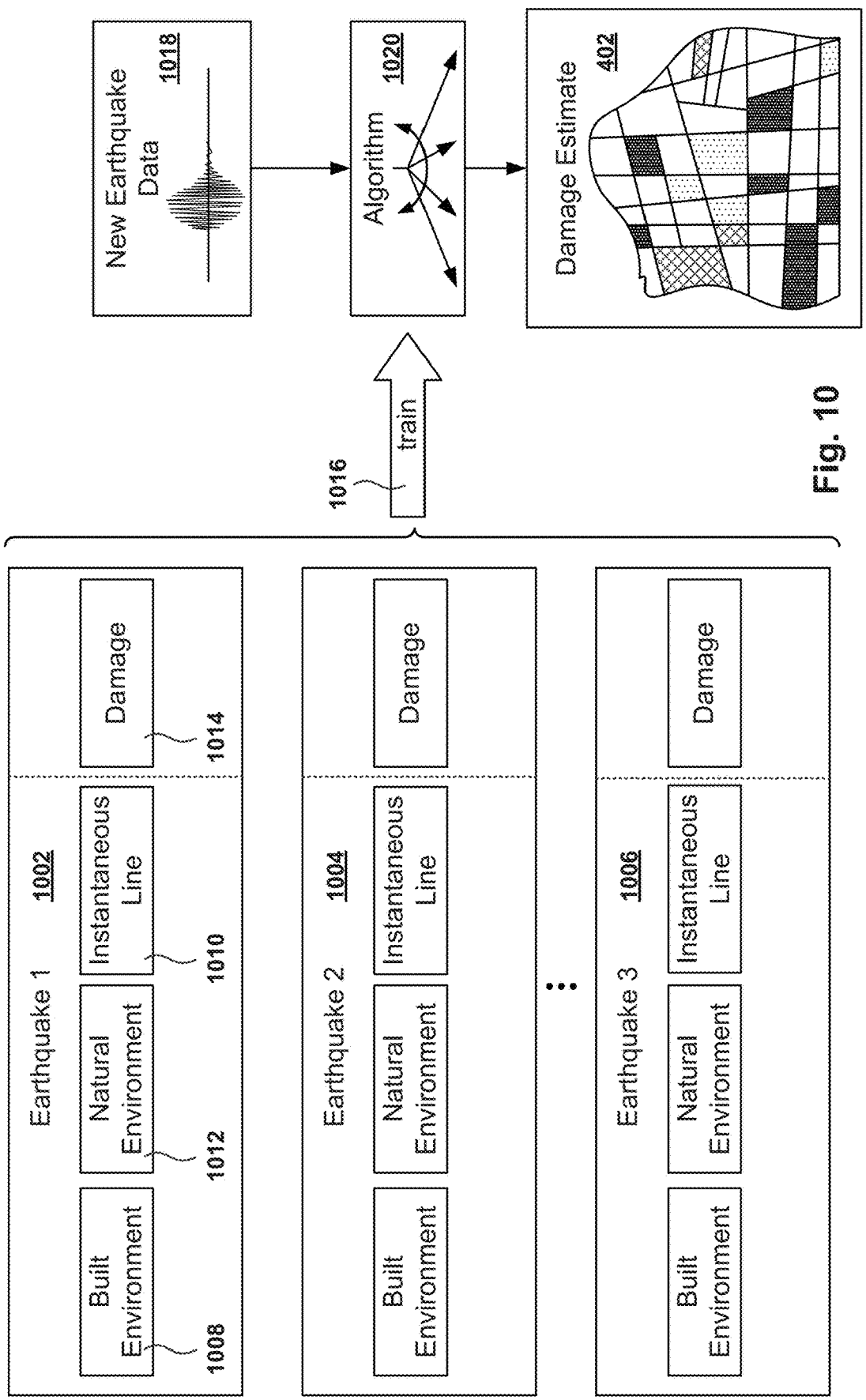
FIG. 10 shows example embodiments illustrating the use of a machine-learning algorithm for predicting earthquake damage.

FIG. 10 shows example embodiments illustrating the use of a machine-learning algorithm for predicting earthquake damage. In some example embodiments, the data from a plurality of earthquakes 1002, 1004, 1006, is collected to train the algorithms. For example, one of the data sources could be building tagging. After an earthquake, building inspectors visit buildings and assign a tag on the severity of the damage to the building. These tags may be used to modify the BDI predictions in real-time.

Another type of data, as discussed earlier, is DYFI data regarding people's impressions of the damage, which may come through entries on a website or through telephone calls. This information provides data for different types of homes and for different types of earthquakes, and this data is geo-coded, including latitude, longitude, and a measurement of damage. New DYFI data points obtained after the earthquake may be used as real-time data input to enrich and improve the initial rea-time BDI predictions. Other real-time data sources include smart-phone applications, manual user-inputs, satellite images, drone images, etc. These additional data sources may be used to modify and improve the accuracy of the initial BDI predictions as time progresses after the earthquake, e.g., hours of days later. In addition, processes such as belief propagation, online learning, and Markov models may be used in conjunction with real-time data to improve the BDI predictions.

In example embodiments, pre-processing of data for algorithm training is performed to fit within a single-family home scope (or any other selected building structure), and as example DYFI responses may not list a location of the building structure during an earthquake. In example embodiments, when an analysis is performed on a single family home, data not pertaining to single-family homes may be removed. Next, in an example embodiment, all response data that is not geo-located by USGS may be removed to enhance precision. In an example embodiment, the data from 50 earthquakes provided in the database, (e.g., with at least 1000 responses remaining), were used for the training set. For example, for privacy constraints, USGS data may publicly report DYFI data with two-digit latitude and longitude accuracy, meaning the geo-located point could be up to about 0.6 km away from the true location of the structure affected by an earthquake.

Further, spectral acceleration information from USGS's ShakeMap website may be obtained for each of the earthquakes. These ShakeMap files may include not only data from strong motion stations throughout the state, but also interpolated spectral ordinates using weighted contributions from three attenuation functions at regular, closely-spaced intervals. Since the locations of many of the machine-learning features described herein, such as spectral acceleration, elevation, soil, etc., are available to four-decimal latitude and longitude accuracy, the two-decimal accuracy of DYFI data may not exactly align with the data from the other sources. To remedy this geographic disparity, using a nearest neighbor function, a nearest value of spectral acceleration may be assigned to each DYFI response. If there was no ShakeMap data point within 1 km of a DYFI response, the DYFI response may be excluded from the training set. Similarly, when appropriating housing data to a DYFI response, the nearest neighbor function may be used.

In some embodiments and as shown in FIG. 10, three types of features are identified: built environment data 1008, natural environment data 1012, and instantaneous line data 1010, also referred to as sensor data. Built environment data 1008 includes data regarding anything built by humans, such as buildings, bridges, roads, airports, etc. Built environment data 1008 includes the type of building, age, size, material, type, number of stories, fragility functions, etc.

"Natural environment" refers to objects or structures present in nature, such as soil, damns, rivers, lakes, etc. Natural environment data 1012 includes features related to soil, such as soil type, soil density, soil liquefaction; data related to water table; elevation, etc. For example, one soil parameter is the shear wave velocity of soil Vs30. This data may be obtained from USGS or FEMA.

Further, instantaneous line data 1010 refers to sensor data obtained during an earthquake, such as by data obtained from earthquake seismographs, which may be operated by the USGS or by other entities that make the information openly available. The shaking information is obtained through one or more scattered measuring stations, but the shaking is estimated throughout the region of interest utilizing ground-motion prediction equations, which predict how much the ground is moving throughout the different locations. Sensor data may also be obtained from accelerometers or other sensors placed on buildings and infrastructure. Further, data from accelerometers in smartphones, laptops, and other computing devices, may be incorporated as instantaneous line data. Both S waves and P waves may be used in real-time as instantaneous line data.

Level of damage 1014 is the variable that is to be estimated or predicted. For training, damage data is associated with the different input features to establish the correlation between each feature and damage. In some example embodiments, the estimated damage is presented in the form of BDI damage, i.e., 0 (e.g., no damage), 1, 2, or 3 (e.g., complete collapse of the structure), but other types of damage assessment categories may also be utilized (e.g., foundation damage).

Once all the data is collected, the machine-learning algorithm training 1016 takes place, and the algorithm is ready for estimating damage. When a new earthquake occurs, the new earthquake data 1018 is obtained (e.g., downloaded from the USGS website). The machine-learning algorithm 1020 uses the new earthquake data 1018 as input to generate damage estimate 402.

Figure 11:
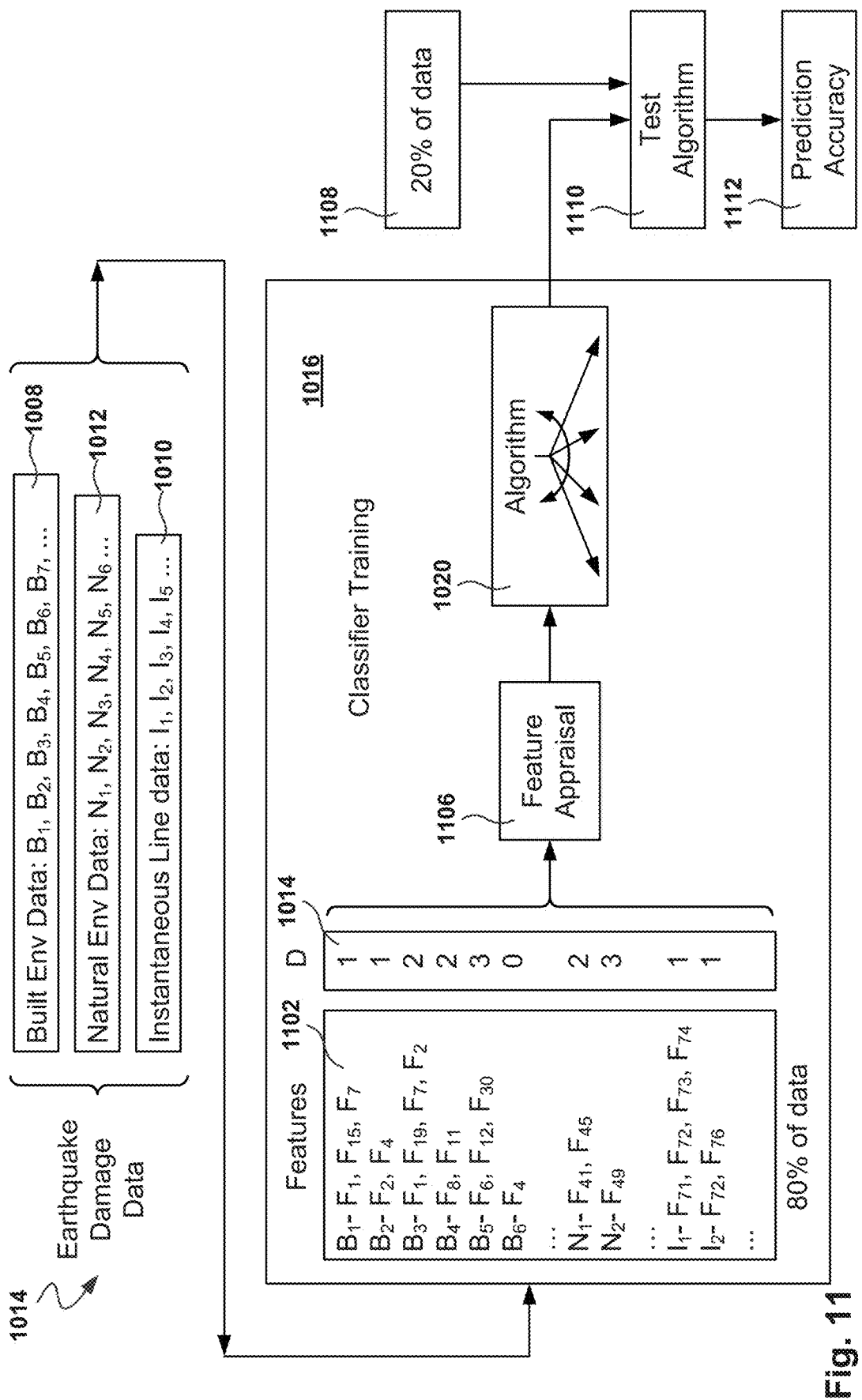
FIG. 11 illustrates a method, according to some example embodiments, for training the algorithm to predict damage.

FIG. 11 illustrates the method, according to some example embodiments, for machine-learning algorithm training 1016 to predict damage, also referred to herein as algorithm learning. As discussed above, in some example embodiments, the training set data includes built environment data 1008, natural environment data 1012, and instantaneous line data 1010. Each of these categories includes one or more types of data, such as $B_1$, $B_2$, $B_3$ for built environment data 1008; $N_1$, $N_2$, $N_3$ for natural environment data 1012; and $I_1$, $I_2$, and $I_3$ for instantaneous line data 1010. For example, $B_1$ is data for a particular house and may include DYFI information such as a crack on the chimney, or any other damage information for the house. Further, for the instantaneous line data 1010, archived live data is used for the training. The data may correspond to one or more earthquakes. In one example embodiment, the data for 52 different earthquakes is utilized.

Each of the data points is correlated to one or more features 1102 and a level of damage 1014. This is the training set for appraising 1106 the relationship between each of the features and the damage caused. Once the appraisal is done, the algorithm 1020 is ready for estimating or predicting damage.

In some example embodiments, part of the data for the level of damage 1014 is not used in the training phase (e.g., 1016), and instead is reserved for testing the accuracy of the algorithm. For example, 80% of the available data is used for training the algorithm, while 20% of the data 1108 is used for testing the algorithm 1110. Different amounts of data may be reserved for testing, such as 10%, 30%, etc., and different segments of the data may be reserved for testing.

In order to test the algorithm 1110, 20% of data 1108 is fed the algorithm as if the data 1108 was originated by a new earthquake. The algorithm then presents damage estimates, and the damage estimates are compared to the actual damage to determine prediction accuracy 1112 of the algorithm.

It is noted that some of the data is available at the building level (e.g., damage inflicted on a specific building) but the predictions, in some example embodiments, refer to damage at the block level.

Sometimes, there is no data for all the buildings in a block, so damage extrapolation is performed. For example, let's say that after an earthquake, a building inspector gives red tags (i.e., BDI 3) to three buildings in a block of 20 buildings, i.e., three out of 20 buildings have damage while the rest have no damage or minor damage.

In some example embodiments, the type of each building is identified, and the fragility functions of the buildings are identified based on the type. Then, a structural engineering assumption is made that the different effects from one building to another are due to each building having a different fragility function, because other features like shaking, soil, etc., are substantially equal for the whole block.

In some example embodiments, the type of the building is unknown, but it may be known that 5% of the buildings have suffered damage. In this case, a fragility function is identified that corresponds to the damage, based on the shaking, and then that fragility function is assigned to the building.

There are four types of validation procedures to test the machine-learning algorithms: intra earthquake, inter-earthquake, geographic division, and holdout cross validation. In intra-earthquake validation, the learning and the testing are performed with data from the same earthquake. For example, the algorithm trains on 80% of the Napa earthquake data and then the algorithm is tested on the remaining 20% of the Napa earthquake data. This is the easiest type of learning.

In inter-earthquake validation, training is done on data from a plurality of past earthquakes (e.g., 20 earthquakes), and then the algorithm is used to predict the effects of another actual earthquake (e.g., the Napa earthquake). Thus, the learning is done without data from the Napa earthquake, and then the validation is performed with data from the Napa earthquake.

In geographic-division validation, the testing is performed on data from a different geographic location. In holdout cross validation, the holdout data used for testing is changed multiple times. For example, 90% of the data is used for learning and 10% of the data is reserved for testing, but the 10% is changed each time. The algorithm keeps improving until the best model is obtained. It is possible to hold out different amounts of data, such as 20% or 30%.

FIG. 12 shows a confusion matrix, according to an example embodiment, for predictions of damage for 512 testing points. It is to be appreciated that a different number of testing points may be used in other example embodiments. A confusion matrix is a table used to describe the performance of a classification model on a set of test data for which the true values are known or assumed based on engineering judgement.

Testing accuracy is measured by determining how many data points where predicted correctly. In the example embodiment of FIG. 12, table 1202 describes the correlation between actual BDI and the predicted BDI. For example, the actual BDI included 107 city blocks with a BDI 2. Of the 107 BDI 2 in the example data, a SVM model correctly classified 97 (91%), and misclassified three for BDI 0 and seven for BDI 1. Additionally, of the 195 BDI 0 in the example data, the SVM model correctly classified 172 (88%), and misclassified 23 as BDI 1. In the given example, the poorest classification is of the BDI 1, where 66 of the 203 were misclassified. Thus, for this example dataset, the model was less accurate for the lower levels of damage. However, this may be a non-critical factor when considering that the lower levels of damage generally do not contribute to major portions of the damage as the structure (e.g., of a home) remains more or less elastic. In other words, it is usually more important to be accurate when predicting higher levels of damage, and the response centers are mostly interested in these higher levels of damage. The performance of the model for each classification level may be tailored relative to the other classification levels based on the specific use case.

FIG. 13 shows a performance comparison of algorithms in accordance with some example embodiments. FIG. 13 illustrates some of the accuracy values obtained for the RF, SVM, and NN algorithms. It is noted that the results illustrated in FIG. 13 are examples, and other data sets may produce different results. The example embodiments illustrated in FIG. 13 should therefore not be interpreted to be exclusive or limiting, but rather exemplary or illustrative.

Using the final feature list, an F score for the SVM model, for the August 2014 (Napa) earthquake, was 0.879. Given the amount of randomness and outliers in damage predictions, this F score indicates fairly good results.

Figure 14:
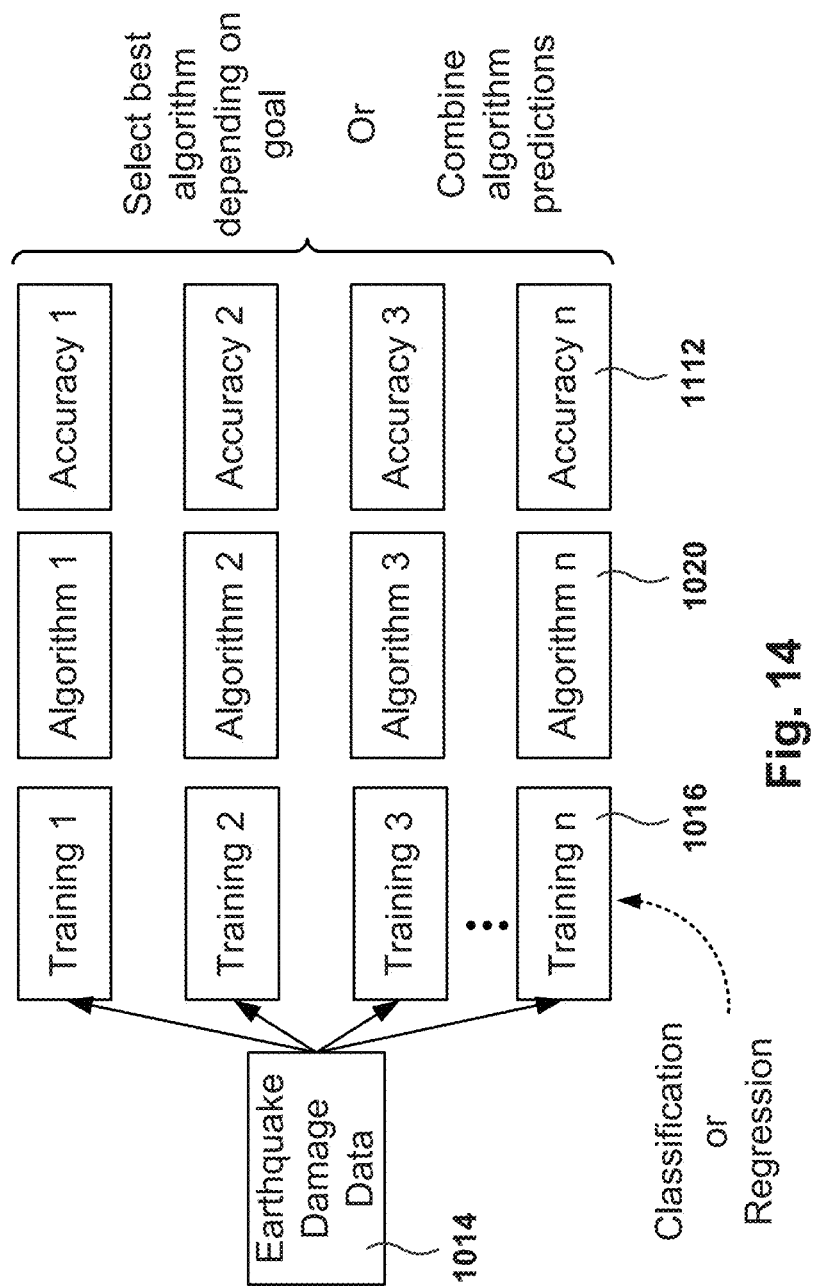
FIG. 14 illustrates example embodiments for the selection of an algorithm based on predictive accuracy.

FIG. 14 illustrates example embodiments for the selection of an algorithm based on predictive accuracy. As discussed above, multiple algorithms 1020 may be used for estimating damage, and training the algorithms 1016 may be performed in different ways to predict accuracy 1112.

Once the algorithms are tested, the best algorithm is selected, although the best algorithm may change depending on the goal and the data set. In other example embodiments, the estimates from the multiple algorithms may be combined depending on the goal.

There are two types of problems in machine learning: classification problems and regression problems. Classification problems aim at classifying items into one of several categories. For example, is this object an apple or an orange? In our case, it is important to classify between damage and no damage.

Regression algorithms aim at quantifying some item, for example by providing a value that is the real number. In some example embodiments, classification is used to determine damage or no damage, and regression is used to determine the level of the damage. For example, the algorithm could obtain a damage value of 1.3, which, depending on the goal, may or may not be rounded to the nearest whole number, e.g., 1.

During testing, ensemble methods provided a high level of accuracy, because ensemble methods utilize multiple learning algorithms, both classification and regression, to improve predictive performance. It has been observed that regression models are good at predicting between BDI's 1, 2, and 3, but classifiers are better at distinguishing between zero and nonzero.

In some example embodiments, the selection of algorithm is biased towards getting BDI labels 2 and 3 correctly, because emergency response managers are especially interested in BDI's 2 and 3, the highest levels of damage. No damage or low damage is not as important for receiving help, but BDI 2 and BDI 3 are much more important. This means that when selecting an algorithm, the algorithms that better predict BDI 2 and BDI 3 are chosen over other algorithms that may perform better for other categories, such as predicting BDI 0 and BDI 1.

One of the problems in predicting damage is selecting the best possible data for learning. Some of the perception data may include people reports such as "I have a broken chimney," or "My picture frame was moving in front of me." However, this type of data may not be helpful for BDI classification.

In order to leverage this type of damage information, other machine-learning methods are used, referred to herein as mini-machine learning models. In the mini-machine learning models, the additional damage data is utilized to predict other factors that may be used by the BDI-classification algorithms, a method referred to as cascading models. For example, it is possible to estimate how many people were awake, or how many broken chimneys were caused by an earthquake, and use this information for estimating damage.

Another problem relates to estimating damage caused by high-magnitude earthquakes. Data for California earthquakes is available, which includes earthquakes in magnitude up to 7.1 on the Richter scale. However, the question remains, is this data good enough to predict a large earthquake (e.g., a 7.5 earthquake)?.

In one example embodiment, transfer-learning techniques are utilized to predict the effects of large earthquakes. Inductive transfer, or transfer learning, is a research problem in machine learning that focuses on storing knowledge gained while solving one problem and applying it to a different but related problem.

Data from other countries that have had large earthquakes is gathered, such as earthquakes in Mexico, Chile, Peru, Ecuador, Japan, and New Zealand. While the type of data available is different because it is not provided by the USGS, it is still useful as damage data. Transfer learning enables the use of this different type of data for predicting large earthquakes in California, or in other parts of the United States.

Figure 15:
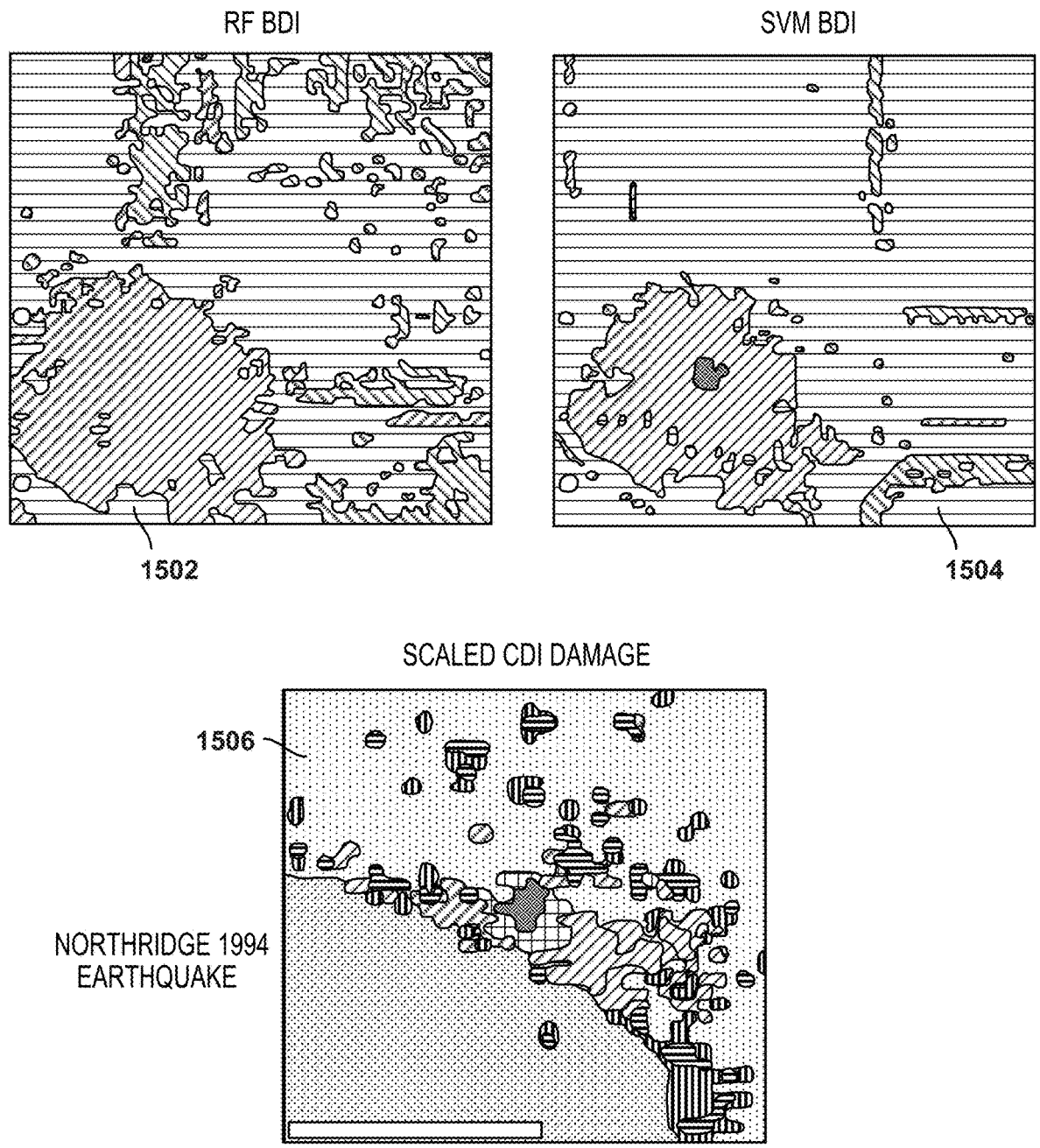
FIG. 15 shows example embodiments of screenshots of damage from the Northridge 1994 earthquake.

FIG. 15 shows example embodiments of screenshots of damage from the Northridge 1994 earthquake. Further, in an example embodiment, a visual comparison is performed to visually compare DYFI CDIs (e.g., scaled from 0-3) with predicted BDIs.

The RF BDI 1502 and SVM BDI 1504 are compared to the scaled CDI damage 1506. In this example embodiment, the SVM BDI 1504 plot predicted smoother boundaries with fewer outliers, especially in the lower damage states. Thus, in an example embodiment, the machine-learning model may supplement the knowledge gaps where DYFI data does not exist.

The example scaled CDI damage 1506 for DYFI data is not very extensive, and thus it is somewhat difficult to visually compare to the RF and SVM performance. In general, however, it appears that the trends between predicted and recorded damage are similar. It appears that the SVM BDI 1504 captures better the higher damage states near the epicenter.

Figure 16:
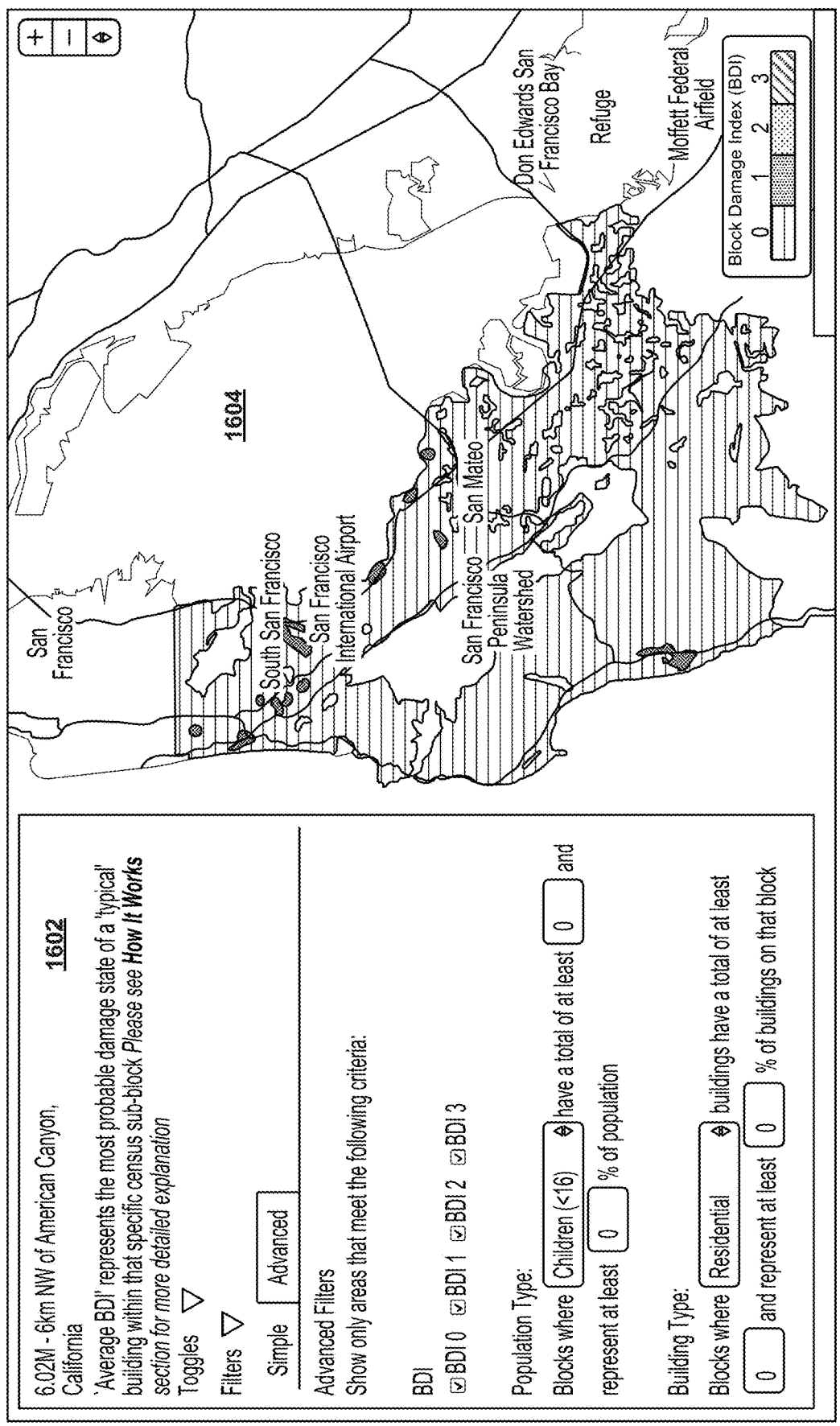
FIG. 16 is an example embodiment of a screenshot of a graphical user interface for presenting damage estimates in the region.

FIG. 16 is an example embodiment of a screenshot of a graphical user interface for presenting damage estimates in the region. FIG. 16 is part of the user interface of a tool for a community disaster-response center. In an example embodiment, a web application is provided to implement the machine-learning model described herein and make educated predictions with regard to the probable damage. In a basic embodiment of the website, a user requests a time slot when an administrator activates the background programs on the server that run on Rails, Python, Javascript, and other programming languages. In an example embodiment, two main modes of the application are provided, namely a homeowner mode and a community-disaster response-center mode.

Typically, the USGS publishes the ShakeMap within seconds after each event. In some example embodiments, the ShakeMap data can be uploaded directly without any pre-processing, and the damage-estimation tool may automatically consider the spectral acceleration (e.g., at 0.3 s). When the ShakeMap includes multiple spectral accelerations, the tuned model(s) learn which spectral accelerations most affect structures or structural features, such as building materials, age, height, etc.

In FIG. 16, map 1604 illustrates the damage estimates for a magnitude 6.02 earthquake. Some of the areas are not analyzed (e.g., wilderness areas with few or no structures), and the remaining areas are presented with color-coded BDI damage. The operator may zoom in or out to obtain better details on the desired area.

Input area 1602 provides filter options for selecting data. For example, a filter is provided to select the BDI category. An operator may select to view only BDI 3 and get a quick view of the most damaged areas. Further, other filters are available, such as filters related to demographics or building types, etc. The operator may select blocks with at least 15 children, or blocks with at least 10% of seniors. This is useful, as seniors usually require more attention than non-seniors do.

Further, the operator may select to present blocks where residential structures are at least 50% of the total. This way, the operator may select between industrial and residential zones.

Demographics are important for the response-center operator, because it might be difficult to justify sending a response team just because a computer program estimated damage. However, having the additional demographics information enables the operator to make decisions to serve areas with high estimated damage and with a high number of senior residents.

Figure 17:
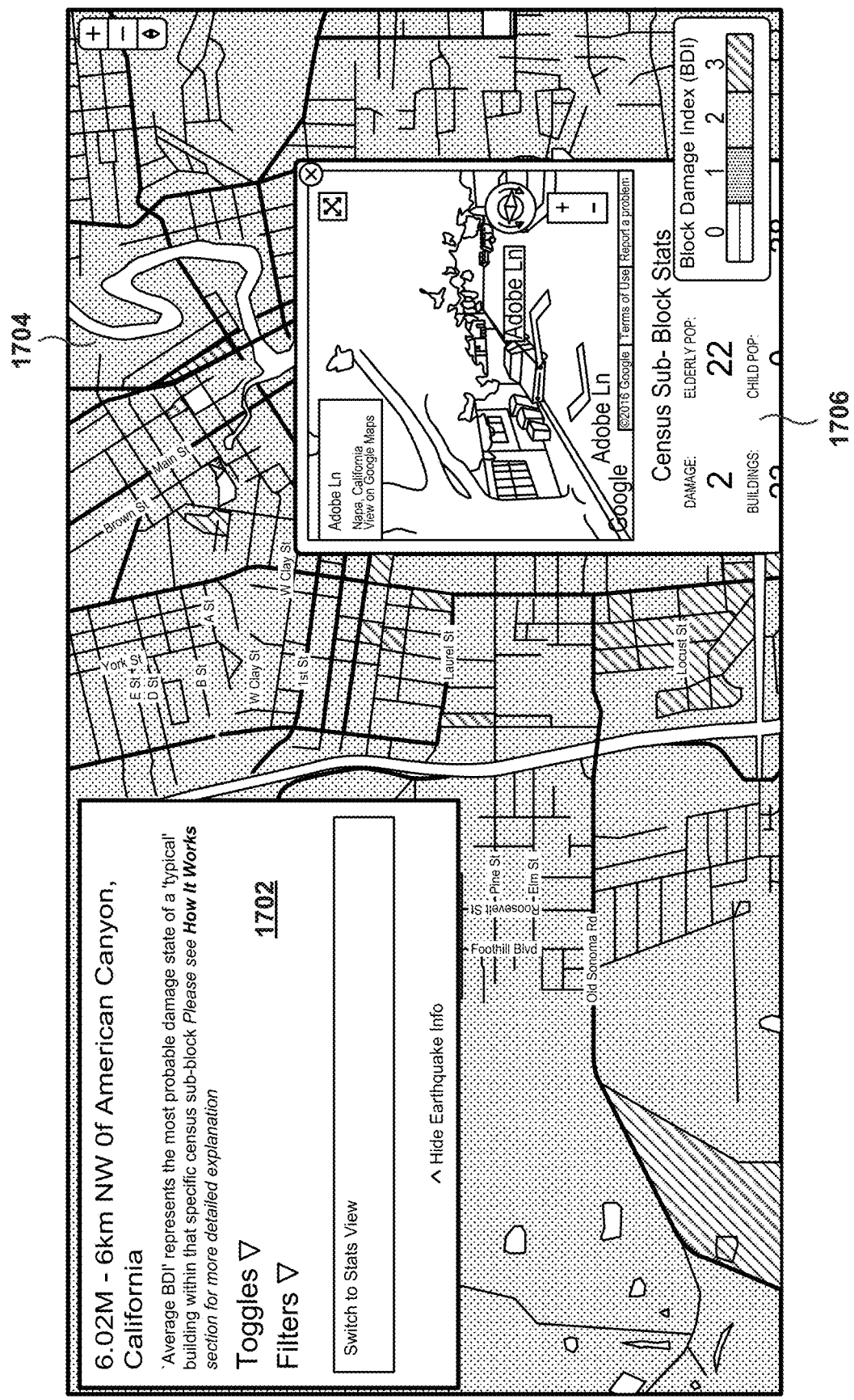
FIG. 17 is an example embodiment of a screenshot of a graphical user interface for presenting damage estimates in the region.

FIG. 17 is an example embodiment of a screenshot of a graphical user interface for presenting damage estimates in the region. Map 1704 shows a more detailed view of the earthquake area, which includes some BDI 3 areas and some BDI 2 areas. In addition, the operator may click on the map 1704 and obtain a street view 1706 of the area, which may be useful when interacting with the response teams.

It is noted that if the operator switches to a statistical view, the damage-estimation tool will present statistics for a selected block or area, such as population, average building age, population density, etc.

Another feature used for estimating damage is called after-shock treatment, which includes considering previous damage data associated with an earlier event. For example, on a certain day a 6.0 earthquake occurs, which results in damage for a particular building, such as broken windows. The next day, there is a 6.0 earthquake, but the particular building may be more susceptible to damage because of the earlier earthquake. The building then suffers additional damage, which would be more damage than if the previous earthquake hadn't occurred.

Since the algorithm takes into consideration the previous damage that compromised the building, the fragility function for the building is changed. In some example embodiments, the fragility function for the building is changed to increase the probability of damage.

In some example embodiments, a technique called belief propagation is used to improve the damage-estimation accuracy. Belief propagation takes into consideration additional data gathered after the event, which is fed to the algorithm to improve its accuracy. For example, after the earthquake, an emergency manager goes to the field and gathers data about actual damage to buildings, then sends the data back to the operator managing the damage estimation algorithms or uploads the data manually or automatically through an electronic application, text message, etc.

For example, a damage of 2 was estimated for a building, but the building inspector indicates that the damage is a 3. The damage-estimation program then changes the label from 2 to 3 for that building, and this additional information is propagated through neighboring buildings, thereby improving the accuracy of prediction for the neighboring buildings. This new data improves the algorithm estimation capability. For example, the algorithm's accuracy may be improved by 5% to 10%, so after a few hours, the accuracy of damage estimation can be up to 90 to 95%. Further, once a building has been repaired, the fragility function of the building returns to its original state.

Figure 18:
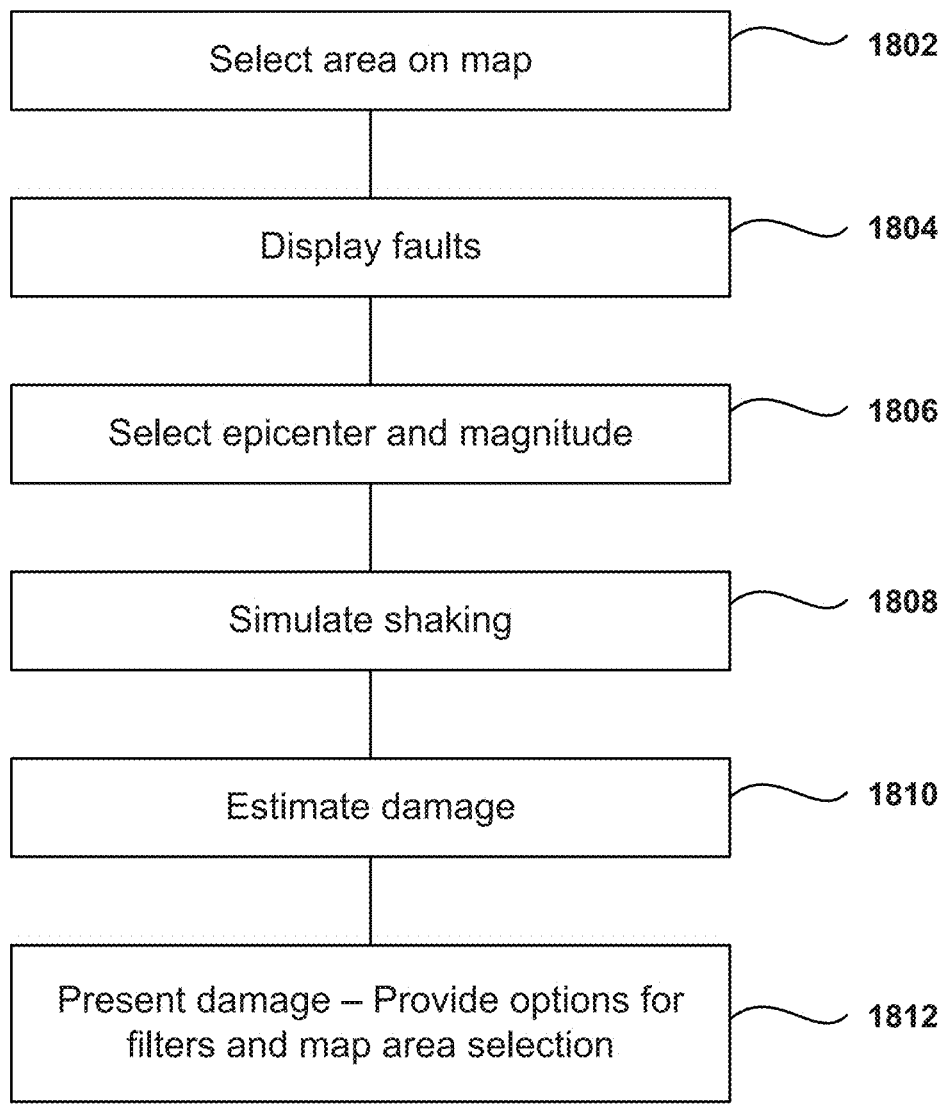
FIG. 18 is a flowchart of a method, according to some example embodiments, for performing damage simulations.

FIG. 18 is a flowchart of a method, according to some example embodiments, for performing damage simulations. While the various operations in this flowchart are presented and described sequentially, one of ordinary skill will appreciate that some or all of the operations may be executed in a different order, be combined or omitted, or be executed in parallel.

In some example embodiments, simulations are performed to estimate damage caused by a hypothetical earthquake. For example, shaking data is simulated, and the corresponding ShakeMap data is created, which is then inputted to the algorithm. Further, a model is created and an estimate of damage is presented.

Simulating damage is an important feature for response managers because it allows the managers to plan for different catastrophic events. By knowing what could happen, the manager is able to prepare plans for a response (e.g., capacity planning) or for retrofitting at-risk buildings. The damage-simulation tool is also useful for training because it enables training exercises based on the hypothetical effects of a catastrophe.

In operation 1802, according to an example embodiment, a map is presented on the damage-simulation tool, and the operator is able to select an area on the map where the epicenter will be located. From operation 1802, the method flows to operation 1804 where the earthquake faults are presented on the map. In addition, the tool presents what is the maximum magnitude estimated for each fault.

In operation 1806, input is received of a selection by the operator for the location and magnitude of the earthquake. In operation 1808, shaking data is simulated for the selected earthquake. Shaking may be predicted at one or more points in each block that is expected to feel shaking above a prescribed threshold. The shaking can be predicted using one or a combination of several, ground motion prediction equations (GMPEs). GMPEs incorporate natural features about the soil, distance to a fault, depth of rupture, etc., to estimate the intensity of ground shaking from an earthquake at a particular location of a particular magnitude.

From operation 1808, the method flows to operation 1810, where the damage is estimated, as described above. In operation 1812, the estimate or prediction of damage is presented, and the operator is provided with a similar interface as in the case of a real earthquake. The operator is able to see where the areas with high estimated damage are situated. In addition, the operator can apply filters to obtain statistical data regarding demographics, or some other type of filter.

The results may be used for areas where retrofitting laws should be enforced because there is a higher risk, or the results may assist the manager to select a location for a hospital, such as by placing the hospital close to high-risk areas. Further, the results may also be used to calculate insurance premiums and deductibles based on location-specific risk, and to conduct capacity analysis of existing resources, such as determining the maximum earthquake magnitude the city can sustain before a particular hospital is overwhelmed with patients, and determining the impact on city-wide emergency response if one hospital collapses during an earthquake (resiliency checking).

Figure 19:
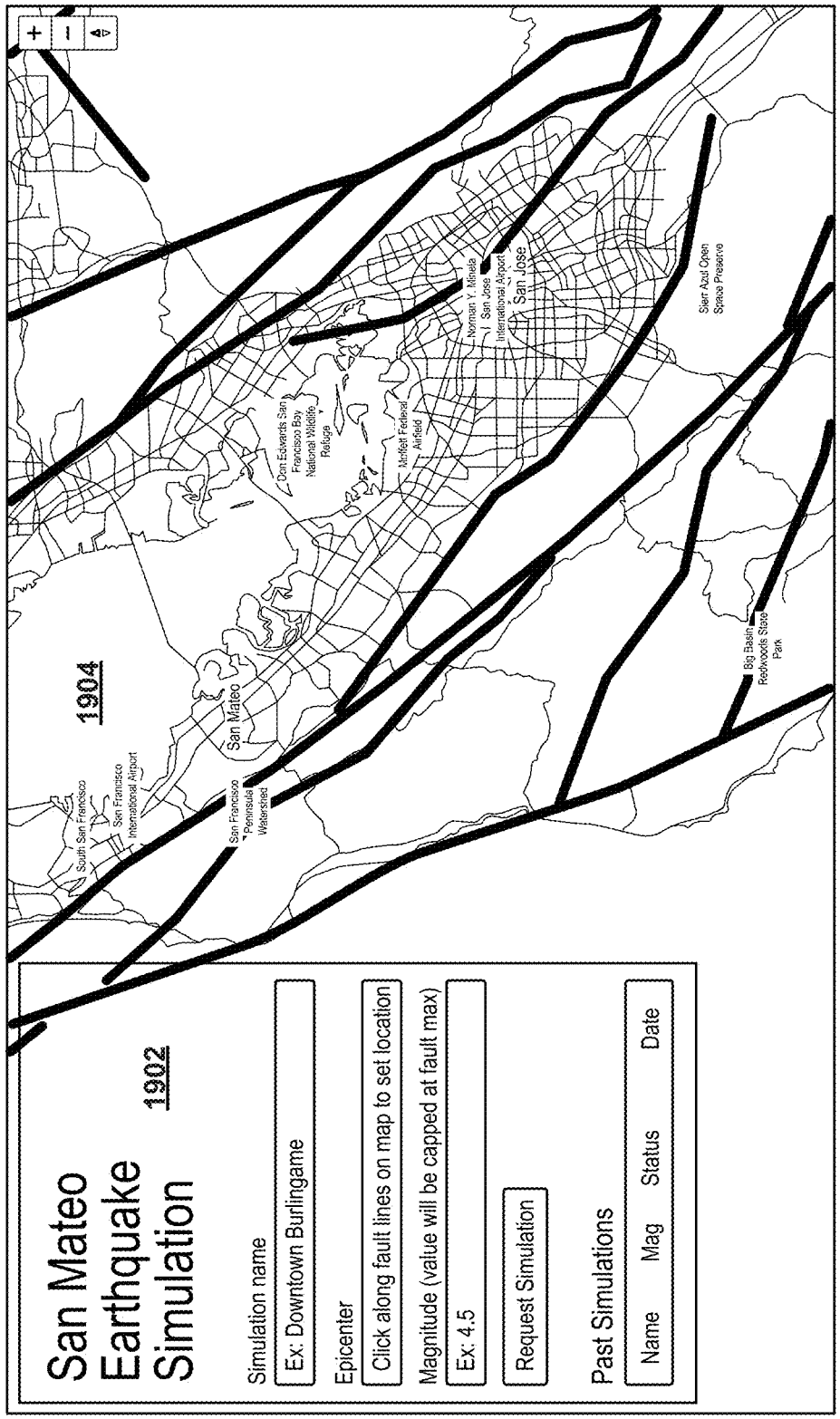
FIG. 19 is an example embodiment of a screenshot of an interface showing earthquake faults.

FIG. 19 is an example embodiment of a screenshot of an interface showing earthquake faults. After the operator selects a region in input area 1902, map 1904 shows the area and the earthquake faults in the area. If the operator runs the cursor over the fault, additional information is provided, such as the name of the fault, the maximum magnitude detected on the fault, and the maximum estimated magnitude earthquake that the fault can generate. The purpose of providing the maximum magnitude is to perform realistic simulations, instead of providing estimates for unlikely scenarios.

Figure 20:
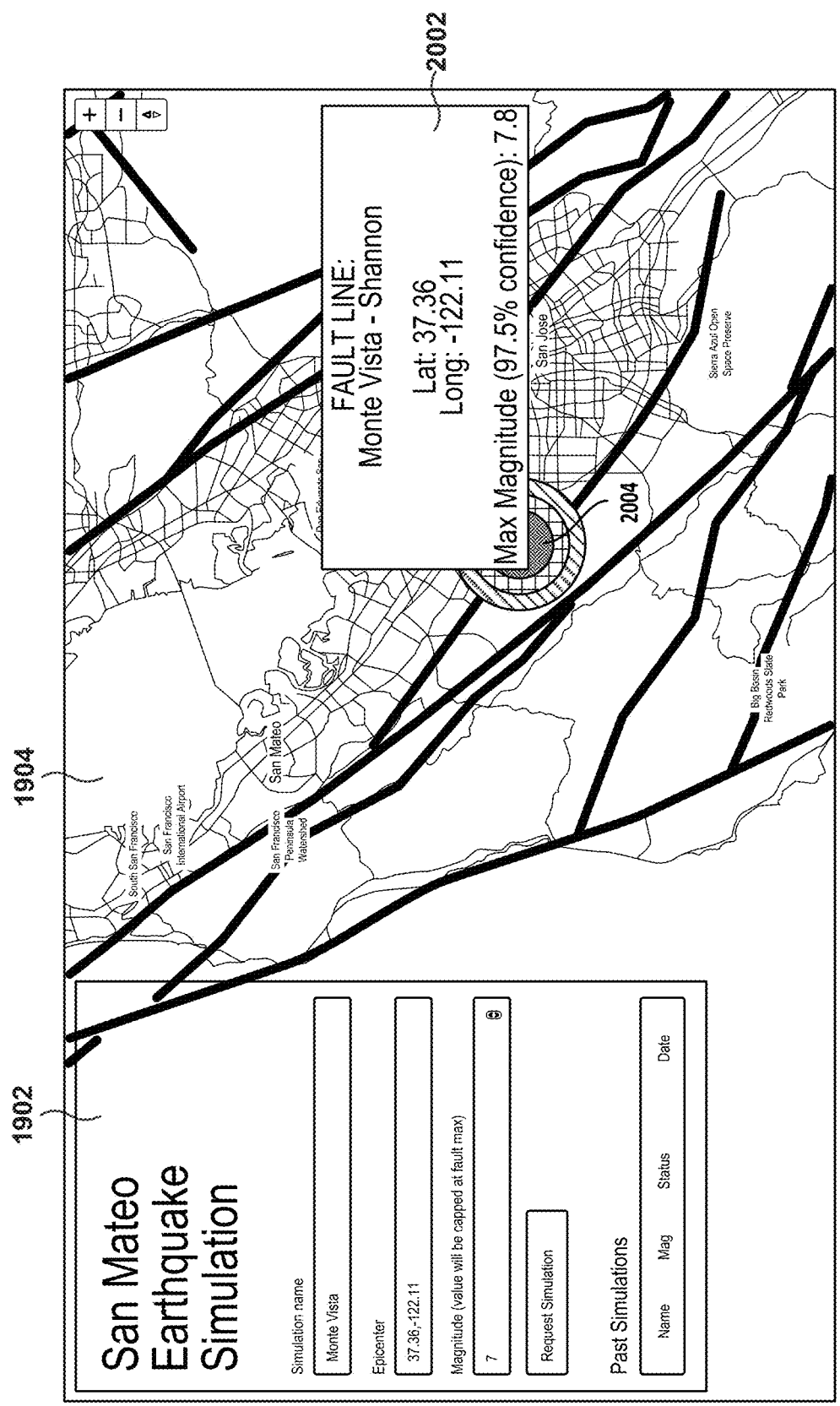
FIG. 20 is an example embodiment of a screenshot of an interface for selecting the location and magnitude of an earthquake.

FIG. 20 is an example embodiment of a screenshot of an interface for selecting the location and magnitude of an earthquake. After the operator selects the epicenter, a graphical display 2004 is presented to indicate the location of the earthquake. In addition, the latitude and longitude are presented. When the operator selects the button labeled "Request Simulation," the simulation is started. Within a few minutes, the simulation is completed, and damage predictions are presented.

Figure 21:
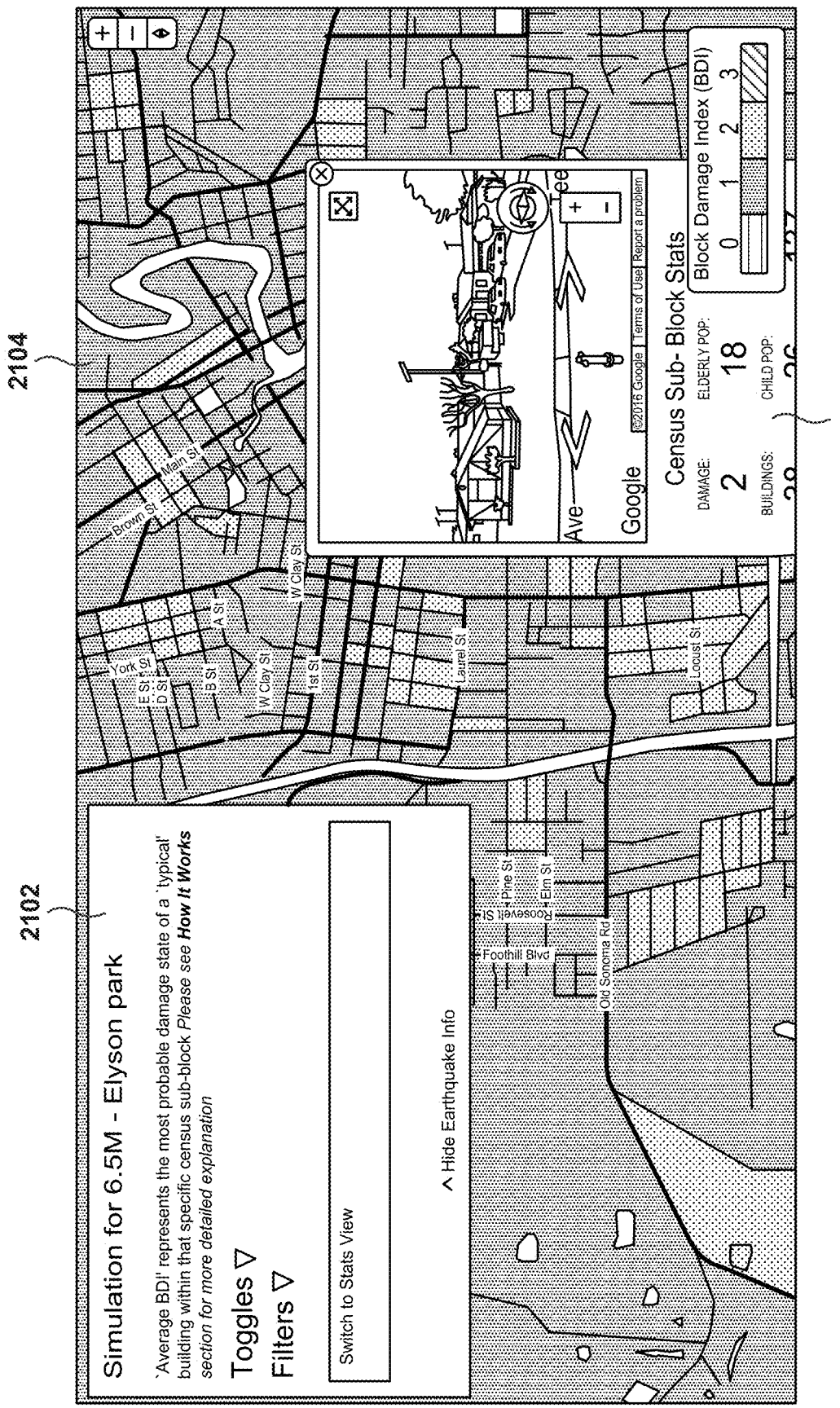
FIG. 21 is an example embodiment of a screenshot of a user interface for presenting simulation data by city block.

FIG. 21 is an example embodiment of a screenshot of a user interface for presenting simulation data by city block. The information presented for simulation is very similar to the user interface for estimating damage after a real earthquake shown in FIG. 16. The interface includes a filter area 2102, a color-coded map 2104, and an optional street view 2106.

As in the case of the real earthquake, the operator may enter filters and use the different options to obtain additional information, or focus on specific damage data, such as areas with a BDI of 3.

FIG. 22 illustrates several damage tables by demographic, according to some example embodiments. FIG. 22 shows an example user interface presented when the user selects to obtain statistical data. The statistical data may include table 2202 for household income levels. The table 2202 indicates how many buildings are associated with a particular BDI damage within a particular income level. There is one row for each BDI level, and one column for each income level (e.g., less than 10K, 10K-30K, 30K-50K, etc.). The statistical data may also include statistics relating to difference between current and previous earthquakes, statistics relating to damage compared to neighboring structures, etc.

Table 2208 provides statistics according to age group. Three columns divide the age groups into children 16 years old or less, adults between 60 and 65 years old, and seniors at least 65 years old. Each row is for one type of BDI damage level.

Table 2204 provides statistical information according to building age. Again, each row corresponds to one of the BDI levels, and each column is for a period when the structure was built. For example, the columns include buildings built before 1940, or built between 1940 and 1959, etc. In each cell, two values are provided: the number of buildings and the percentage of buildings of this age within the BDI damage class.

Table 2206 provides statistical data according to building type: residential, commercial, or government. In this table, each BDI class is associated with a column, and the building type with each row. The value in each cell identifies the count of buildings for this particular BDI damage. Table 2210 provides statistical information regarding resident population, each column being associated with a BDI class, and each row being associated with a type of resident.

Figure 23:
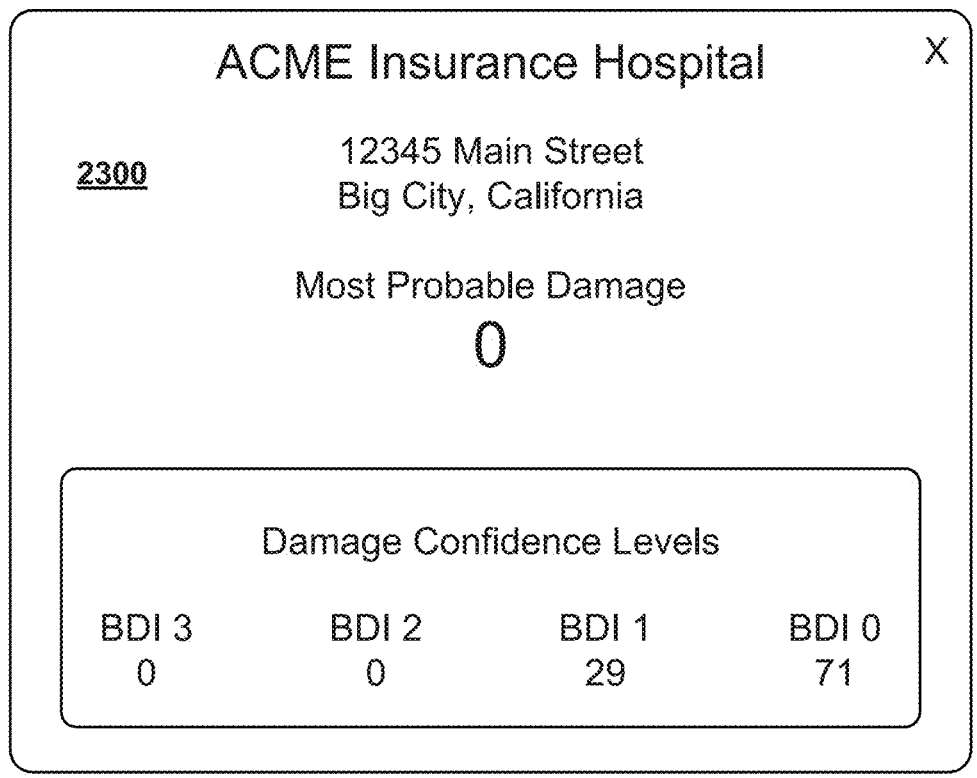
FIG. 23 illustrates the detail provided for a special building, according to some example embodiments.

FIG. 23 illustrates the details provided for a special building, according to some example embodiments. The response-center manager may identify special buildings that require special tracking, such as hospitals, City Hall, fire stations, etc. The operator is able to enter additional information for these buildings, including type of construction, age, contact person, etc. For these important buildings, the tool calculates a building-damage estimate instead of just the city-block level estimate.

The tool provides specific damage information for these special buildings. FIG. 23 illustrates the information presented when the manager clicks on the building. In some embodiments, the information presented 2300 includes the name of the building, the address, a damage estimate, and confidence levels for the different types of damage. In the example embodiment of FIG. 23, the damage is estimated in category 0 with a 71% probability, and in category 1 with a 29% probability.

Figure 24:
FIG. 24 shows an example embodiment of a screenshot of a GUI accessible via a website to enter data regarding a building structure (e.g., a dwelling).

FIG. 24 shows an example embodiment of a screenshot of a GUI accessible via a website to enter data regarding a building structure (e.g., a dwelling). FIG. 24 illustrates a sample homeowner module.

An average homeowner may know little about earthquake engineering, but may be interested in risk exposure. Accordingly, user inputs provided by the web application may be few, and typically within homeowner knowledge.

An input zone shows fields for a user (e.g., homeowner) to enter information relevant to the physical structure or the contents thereof. This may be accomplished by the "Prediction form". The method and systems described herein may then be performed (e.g., by a remote server) to provide prediction results.

In an example embodiment, the website may allow the user to input home location, replacement value of the home (which includes structural and non-structural components, but not property value), the replacement value of contents, or the like. The website may make four BDI predictions using Sa intensities from the hazard curve corresponding to re-turn periods of 2475, 475, 50, and 20 years. The algorithm may make 10 predictions per hazard level, takes the mean BDI, and rounds to the nearest whole number. For example, to determine loss calculations, the method or functionality included in the website takes a weighted average of all 10 iterations. Moreover, the user may also get an idea of the potential losses, which the user could face annually, as well as recovery time for all four hazard levels. This information could be useful in household financial planning in order to protect assets against seismic risk.

Figure 25:
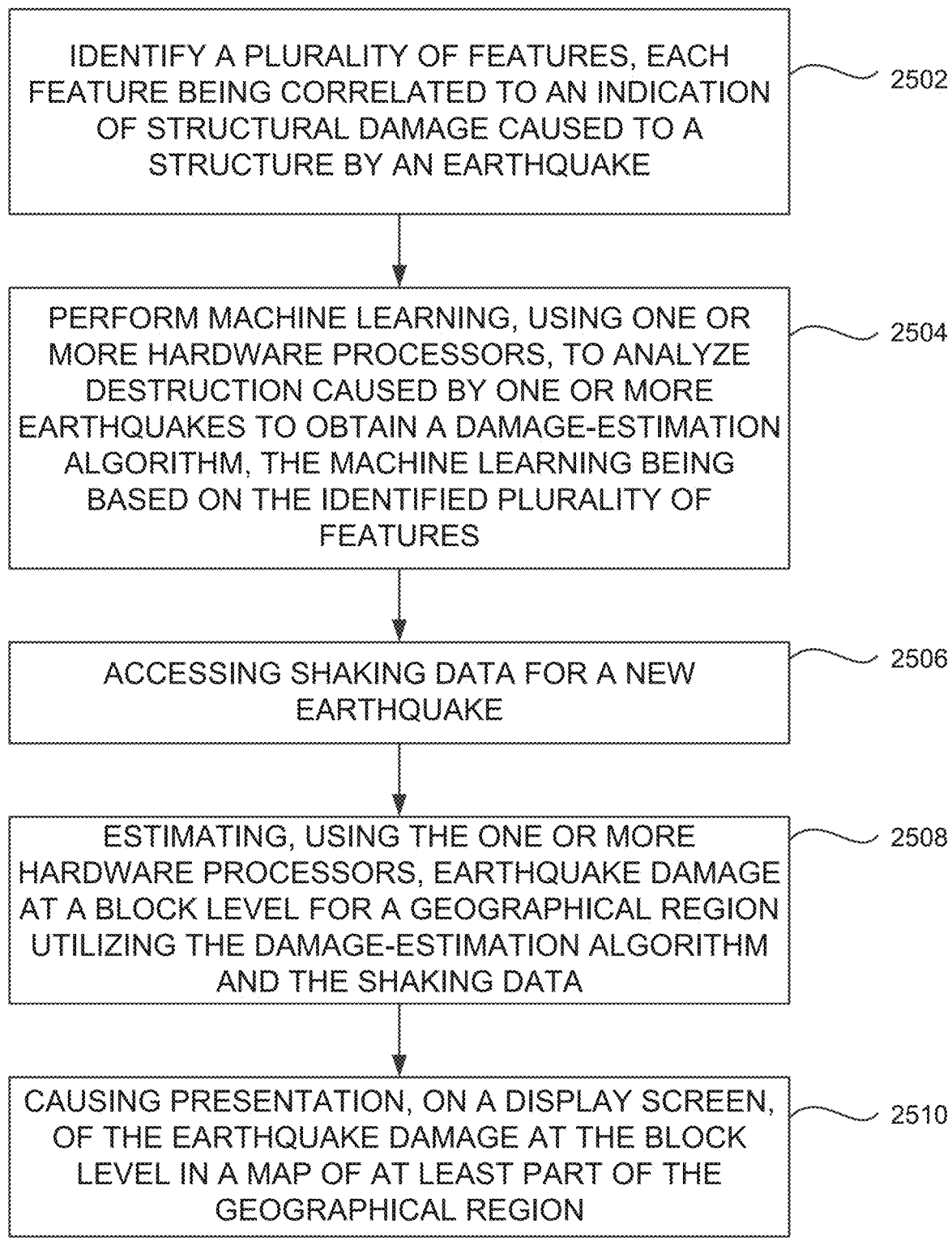
FIG. 25 is a flowchart of a method, according to some example embodiments, for predicting the scale and scope of damage after an earthquake.

FIG. 25 is a flowchart of a method, according to some example embodiments, for predicting the scale and scope of damage after an earthquake. While the various operations in this flowchart are presented and described sequentially, one of ordinary skill will appreciate that some or all of the operations may be executed in a different order, be combined or omitted, or be executed in parallel.

Operation 2502 is for identifying a plurality of features, each feature being correlated to an indication of structural damage caused to a structure by an earthquake. From operation 2502, the method flows to operation 2504 where machine learning is performed, using one or more hardware processors, to analyze destruction caused by one or more earthquakes to obtain a damage-estimation algorithm, the machine learning being based on the identified plurality of features.

From operation 2504, the method flows to operation 2506 for accessing shaking data for a new earthquake. In operation 2508, earthquake damage is estimated, using the one or more hardware processors, at a block level for a geographical region utilizing the damage-estimation algorithm and the shaking data.

From operation 2508, the method flows to operation 2510 for causing presentation, on a display screen, of the earthquake damage at the block level in a map of at least part of the geographical region.

In some implementations, estimating earthquake damage at a block level includes performing statistical analysis of the structures for each block based on features of structures in the block, and estimating the earthquake damage at the block level based on the statistical analysis of the structures in each block.

In some example embodiments, the plurality of features are classified into built environment, natural environment, or sensor data. The built environment is for structures that have been built, the natural environment is for structures occurring in nature, and the instantaneous line includes shaking data from one or more sensors in one or more locations.

In some example embodiments, built environment features include one or more of structure location, structure size, structure prize, year built, number of stories, commercial or residential structure, building material of structure, chimney present, and number of stories. Further, natural environment features include one or more of soil type, soil density, soil liquefaction, elevation, and water table. The instantaneous line features include one or more of earthquake magnitude, duration of earthquake, earthquake epicenter, spectral acceleration, and spectral displacement.

In some example embodiments, the method further includes determining an accuracy of a plurality of machine-learning algorithms, and selecting the machine-learning algorithm with the best accuracy.

In some example embodiments, accessing shaking data further includes receiving ShakeMap information from the USGS after the new earthquake, accessing damage inspection data after the new earthquake, inputting the obtained damage inspection data to the damage-estimation algorithm, and re-estimating earthquake damage after inputting the obtained damage inspection data.

In some example embodiments, the plurality of features include a fragility curve for a structure based on construction material, size, seismic zone, and seismic design code. In other example embodiments, the earthquake damage at the block level is presented within a user interface of a disaster-response-center module.

In some example embodiments, the method also includes estimating financial loss of a first structure based on estimated earthquake damage to the first structure and a replacement value of the first structure. In some example embodiments, performing machine learning to analyze the destruction by one or more earthquakes further includes applying a transfer-learning operation to apply data from an event in a first geographical area to an event in a second geographical area. In some example embodiments, the earthquake damage includes classifying each block at one of four damage states. In some example embodiments, each block corresponds to a census block that has been defined by the United States Census Bureau. In some example embodiments, BDIs, and other damage or financial loss predictions, may be reported in the form or a report in addition to, or in lieu of, a map.

Figure 26:
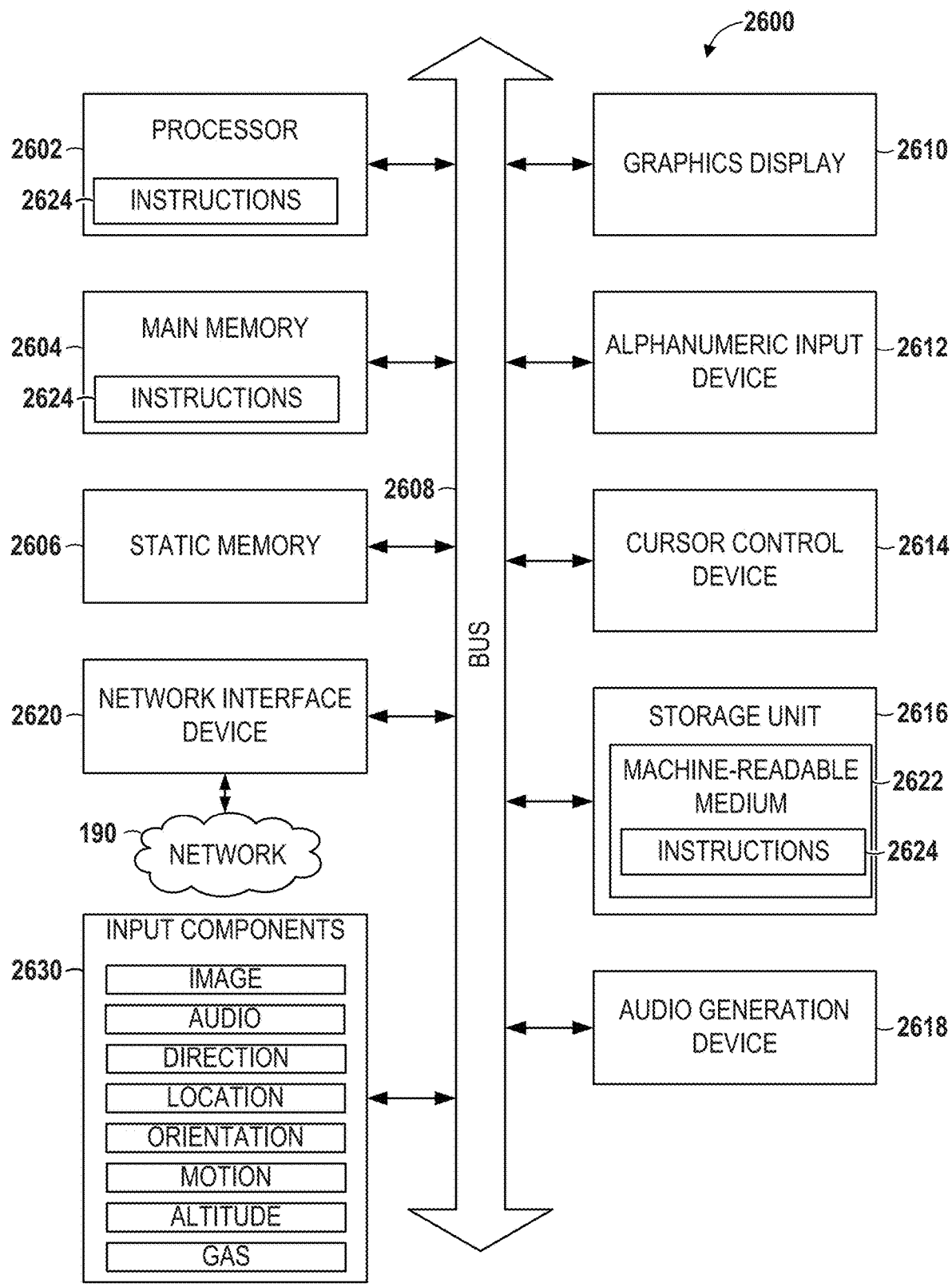
FIG. 26 is a block diagram illustrating components of a machine, according to some example embodiments, able to read instructions from a machine-readable medium and perform any one or more of the methodologies discussed herein.

FIG. 26 is a block diagram illustrating components of a machine 2600, according to some example embodiments, able to read instructions 2624 from a machine-readable medium 2622 (e.g., a non-transitory machine-readable medium, a machine-readable storage medium, a computer-readable storage medium, or any suitable combination thereof) and perform any one or more of the methodologies discussed herein, in whole or in part.

Specifically, FIG. 26 shows the machine 2600 in the example form of a computer system (e.g., a computer) within which the instructions 2624 (e.g., software, a program, an application, an applet, an app, or other executable code) for causing the machine 2600 to perform any one or more of the methodologies discussed herein may be executed, in whole or in part.

In alternative embodiments, the machine 2600 operates as a standalone device or may be connected (e.g., networked) to other machines. In a networked deployment, the machine 2600 may operate in the capacity of a server machine or a client machine in a server-client network environment, or as a peer machine in a distributed (e.g., peer-to-peer) network environment. The machine 2600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 2624, sequentially or otherwise, that specify actions to be taken by that machine. Further, while only a single machine is illustrated, the term "machine" shall also be taken to include any collection of machines that individually or jointly execute the instructions 2624 to perform all or part of any one or more of the methodologies discussed herein.

The machine 2600 may include one or more of a processor 2602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2604, and a static memory 2606, which are configured to communicate with each other via a bus 2608. The processor 2602 may contain microcircuits that are configurable, temporarily or permanently, by some or all of the instructions 2624 such that the processor 2602 is configurable to perform any one or more of the methodologies described herein, in whole or in part. For example, a set of one or more microcircuits of the processor 2602 may be configurable to execute one or more modules (e.g., software modules) described herein.

The machine 2600 may further include a graphics display 2610 (e.g., a plasma display panel (PDP), a light emitting diode (LED) display, a liquid crystal display (LCD), a projector, a cathode ray tube (CRT), or any other display capable of displaying graphics or video). The machine 2600 may also include an alphanumeric input device 2612 (e.g., a keyboard or keypad), a cursor control device 2614 (e.g., a mouse, a touchpad, a trackball, a joystick, a motion sensor, an eye tracking device, or other pointing instrument), a storage unit 2616, an audio generation device 2618 (e.g., a sound card, an amplifier, a speaker, a headphone jack, or any suitable combination thereof), and a network interface device 2620.

The storage unit 2616 includes the machine-readable medium 2622 (e.g., a tangible and non-transitory machine-readable storage medium) on which are stored the instructions 2624 embodying any one or more of the methodologies or functions described herein. The instructions 2624 may also reside, completely or at least partially, within the main memory 2604, within the processor 2602 (e.g., within the processor's cache memory), or both, before or during execution thereof by the machine 2600. Accordingly, the main memory 2604 and the processor 2602 may be considered machine-readable media (e.g., tangible and non-transitory machine-readable media). The instructions 2624 may be transmitted or received over the network 190 via the network interface device 2620. For example, the network interface device 2620 may communicate the instructions 2624 using any one or more transfer protocols (e.g., hypertext transfer protocol (HTTP)).

In some example embodiments, the machine 2600 may be a portable computing device, such as a smart phone or tablet computer, and have one or more additional input components 2630 (e.g., sensors or gauges). Examples of such input components 2630 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of the input components 2630 may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2622 is shown in an example embodiment to be a single medium, the term "machine-readable medium" should be taken to include a single medium or multiple media (e.g., a centralized or distributed database, or associated caches and servers) able to store instructions 2624. The term "machine-readable medium" shall also be taken to include any medium, or combination of multiple media, that is capable of storing the instructions 2624 for execution by the machine 2600, such that the instructions 2624, when executed by one or more processors of the machine 2600 (e.g., processor 2602), cause the machine 2600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the present subject matter is described with reference to specific example embodiments, various modifications and changes may be made to these example embodiments without departing from the broader scope of embodiments of the present disclosure. Such example embodiments of the present subject matter may be referred to herein, individually or collectively, by the term "invention" merely for convenience and without intending to voluntarily limit the scope of this application to any single disclosure or present concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A method comprising:
    identifying a plurality of features for an earthquake-damage estimation algorithm, the features comprising:
        destruction information for structures within a geographical region caused by an earthquake that happened in the past;
        earthquake data comprising duration of shaking, epicenter location, and spectral acceleration of the earthquake; and
        fragility curves for structures in the geographical region, the fragility curves based on construction material, seismic zone, and seismic design code;
    preparing a training set k including values for the identified plurality of features for one or more earthquakes;
    training a machine-learning model, using one or more hardware processors, with the training set to obtain the earthquake-damage estimation algorithm, the training of the machine-learning model being based on the identified plurality of features;
    accessing new earthquake data for a new earthquake, the new earthquake data comprising duration of shaking of the new earthquake, epicenter location of the new earthquake, and spectral acceleration of the new earthquake;
    estimating, using the one or more hardware processors, earthquake damage at a block level for the blocks in the geographical region utilizing the earthquake-damage estimation algorithm and the new earthquake data, the earthquake damage for the block representing a most probable damage state of a building in the block from a plurality of damage states; and
    causing presentation, on a display screen, of the earthquake damage at the block level in a map of at least part of the geographical region.

2. The method as recited in claim 1, wherein estimating the earthquake damage at the block level further comprises:
    for each block in the geographical region, determining values of the features of the structures in the block; and
    estimating the earthquake damage at the block level based on the values of the features of the structures in each block.

3. The method as recited in claim 1, wherein the plurality of features for training the machine-learning model are classified into built environment, natural environment, and instantaneous line, wherein the built environment is for structures that have been built, wherein the natural environment is for structures occurring in nature, wherein the instantaneous line comprises the earthquake data.

4. The method as recited in claim 3, wherein the built environment features for training the machine-learning model comprise structure location, year built, number of stories, commercial or residential structure, and building material of structure.

5. The method as recited in claim 3, wherein the natural environment features for training the machine-learning model comprise soil type, soil density, elevation, and water table.

6. The method as recited in claim 3, wherein the instantaneous line features for training the machine-learning model comprise the duration of shaking, the epicenter location, the spectral acceleration, and spectral displacement.

7. The method as recited in claim 1, further comprising:
determining an accuracy of a plurality of machine-learning models; and
selecting one or more machine-learning models and associated tuning parameters to apply, in parallel or in sequence, based on the machine-learning models respective accuracy.

8. The method as recited in claim 1, wherein accessing the new earthquake data further comprises:
receiving the new earthquake data as ShakeMap information from United States Geological Survey after the new earthquake, wherein the earthquake damage at the block level is based on the received ShakeMap information.

9. The method as recited in claim 8, wherein accessing the new earthquake data further comprises:
accessing damage inspection data after the new earthquake;
inputting the accessed damage inspection data to the earthquake-damage estimation algorithm; and
re-estimating the earthquake damage after inputting the accessed damage inspection data.

10. The method as recited in claim 1, wherein each block corresponds to a census block that has been defined by the United States Census Bureau.

11. The method as recited in claim 1, wherein the earthquake damage at the block level is presented within a user interface of a disaster-response-center module.

12. The method as recited in claim 1, further comprising:
estimating financial loss of a first structure based on estimated earthquake damage to the first structure and a replacement value of the first structure.

13. The method as recited in claim 1, wherein training the machine-learning model further comprises:
applying a transfer-learning operation to apply data from an earthquake event in a first geographical area to an earthquake event in a second geographical area.

14. The method as recited in claim 1, wherein estimating the earthquake damage comprises classifying each block at one of four damage states, each damage state associated with a level of damage caused by the earthquake in the block.

15. A non-transitory machine-readable storage medium including instructions that, when executed by a machine, causes the machine to perform operations comprising:
identifying a plurality of features for an earthquake-damage estimation algorithm, the features comprising:
destruction information for structures within a geographical region caused by an earthquake that happened in the past;
earthquake data comprising duration of shaking, epicenter location, and spectral acceleration of the earthquake; and
fragility curves for structures in the geographical region, the fragility curves based on construction material, seismic zone, and seismic design code;
preparing a training set b including values for the identified plurality of features for one or more earthquakes;
training a machine-learning model with the training set to obtain the earthquake-damage estimation algorithm, the training of the machine-learning model being based on the identified plurality of features;
accessing new earthquake data for a new earthquake, the new earthquake data comprising duration of shaking of the new earthquake, epicenter location of the new earthquake, and spectral acceleration of the new earthquake;
estimating earthquake damage at a block level for the blocks in the geographical region utilizing the earthquake-damage estimation algorithm and the new earthquake data, the earthquake damage for the block representing a most probable damage state of a building in the block from a plurality of damage states; and
causing presentation, on a display screen, of the earthquake damage at the block level in a map of at least part of the geographical region.

16. The machine-readable storage medium as recited in claim 15, wherein estimating earthquake damage at the block level further comprises:
for each block in the geographical region, determining values of the features of the structures in the block; and
estimating the earthquake damage at the block level based on the values of the features of the structures in each block.

17. The machine-readable storage medium as recited in claim 15, wherein the plurality of features for training the machine-learning model are classified into built environment, natural environment, and instantaneous line, wherein the built environment is for structures that have been built, wherein the natural environment is for structures occurring in nature, wherein the instantaneous line comprises the earthquake data.

18. A system, comprising:
a memory comprising instructions; and
one or more computer processors, wherein the instructions, when executed by the one or more computer processors, cause the one or more computer processors to perform operations comprising:
identifying a plurality of features for an earthquake-damage estimation algorithm, the features comprising:
destruction information for structures within a geographical region caused by an earthquake that happened in the past;
earthquake data comprising duration of shaking, epicenter location, and spectral acceleration of the earthquake; and
fragility curves for structures in the geographical region, the fragility curves based on construction material, seismic zone, and seismic design code;
preparing a training set by including values for the identified plurality of features for one or more earthquakes;
training a machine-learning model with the training set to obtain the earthquake-damage estimation algorithm, the training of the machine-learning model being based on the identified plurality of features;
accessing new earthquake data for a new earthquake, the new earthquake data comprising duration of shaking of the new earthquake, epicenter location of the new earthquake, and spectral acceleration of the new earthquake;
estimating earthquake damage at a block level for the blocks in the geographical region utilizing the earthquake-damage estimation algorithm and the new earthquake data, the earthquake damage for the block representing a most probable damage state of a building in the block from a plurality of damage states; and
causing presentation, on a display screen, of the earthquake damage at the block level in a map of at least part of the geographical region.

19. The system as recited in claim 18, wherein estimating earthquake damage at the block level further comprises:
- for each block in the geographical region, determining values of the features of the structures in the block; and
- estimating the earthquake damage at the block level based on the values of the features of the structures in each block.

20. The system as recited in claim 18, wherein accessing new earthquake data further comprises:
- accessing the new earthquake data as ShakeMap information from United States Geological Survey after the new earthquake, wherein the earthquake damage at the block level is based on the received ShakeMap information;
- accessing damage inspection data after the new earthquake;
- inputting the damage inspection data to the earthquake-damage estimation algorithm; and
- re-estimating earthquake damage after inputting the damage inspection data.

* * * * *

UNITED STATES PATENT AND TRADEMARK OFFICE
CERTIFICATE OF CORRECTION

PATENT NO. : 10,740,684 B1
APPLICATION NO. : 15/246919
DATED : August 11, 2020
INVENTOR(S) : Wani et al.

Page 1 of 1

It is certified that error appears in the above-identified patent and that said Letters Patent is hereby corrected as shown below:

In the Claims

Column 28, Line 19, Claim 1, delete "k" and insert --by-- therefor

Column 29, Line 57, Claim 15, delete "b" and insert --by-- therefor

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*